(12) United States Patent
Phan

(10) Patent No.: US 11,544,421 B2
(45) Date of Patent: Jan. 3, 2023

(54) WIND NOISE ANALYZER AND WIND NOISE ANALYSIS METHOD

(71) Applicant: TOYOTA JIDOSHA KABUSHIKI KAISHA, Toyota (JP)

(72) Inventor: Long Vinh Phan, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 926 days.

(21) Appl. No.: 16/390,231

(22) Filed: Apr. 22, 2019

(65) Prior Publication Data

US 2019/0331510 A1   Oct. 31, 2019

(30) Foreign Application Priority Data

Apr. 27, 2018   (JP) ............... JP2018-087378

(51) Int. Cl.
| | |
|---|---|
| *G06F 30/15* | (2020.01) |
| *G01M 9/08* | (2006.01) |
| *G01F 1/20* | (2006.01) |
| *G06F 30/20* | (2020.01) |
| *G01F 1/325* | (2022.01) |
| *G06F 30/28* | (2020.01) |
| *G06F 119/10* | (2020.01) |

(52) U.S. Cl.
CPC ............. *G06F 30/15* (2020.01); *G01F 1/206* (2013.01); *G01F 1/3282* (2022.01); *G01M 9/08* (2013.01); *G06F 30/20* (2020.01); *G06F 30/28* (2020.01); *G06F 2119/10* (2020.01)

(58) Field of Classification Search
CPC .......... G01M 9/00; G01M 9/08; G06F 30/15; G06F 30/20; G06F 30/28
See application file for complete search history.

(56) References Cited

U.S. PATENT DOCUMENTS

| | | |
|---|---|---|
| 5,568,404 A | 10/1996 | Strumolo |
| 2005/0114097 A1 | 5/2005 | Duncan |

(Continued)

FOREIGN PATENT DOCUMENTS

JP   2017-062727 A   3/2017

OTHER PUBLICATIONS

Ono, K. et al., "Prediction of wind noise radiated from passenger cars and its evaluation based on auralization," Journal of Wind Engineering and Industrial Aerodynamics, vol. 81, 1999, pp. 403-419.

(Continued)

*Primary Examiner* — Erika J. Villaluna
(74) *Attorney, Agent, or Firm* — Oliff PLC

(57) ABSTRACT

A wind noise analyzer includes: an unsteady computational fluid dynamics calculation unit configured to execute an unsteady computational fluid dynamics simulation involving moving a structure model modeled on a structure, and calculate, for each of spatial nodes, an average flow velocity and an average vorticity over a predetermined time in a flow field inside the predetermined region, and then calculate, for each of the spatial nodes, a value based on an amplitude of a turbulent flow velocity inside the predetermined region, in an angular frequency band of interest; and a pressure source density calculation unit configured to calculate, based on the average flow velocity, the average vorticity, and the value based on the amplitude of the turbulent flow velocity, a pressure source density.

1 Claim, 13 Drawing Sheets

(56) References Cited

U.S. PATENT DOCUMENTS

2017/0091352 A1 3/2017 Phan
2019/0354647 A1 11/2019 Long

OTHER PUBLICATIONS

Feb. 8, 2022 Office Action issued in U.S. Appl. No. 16/414,351.
Apr. 20, 2021 Office Action dated U.S. Appl. No. 16/414,351.
Balasubramanian, Ganapathi, et al. "A Computational Process for Early Stage Assessment of Automotive Buffeting and Wind Noise." SAE International Journal of Passenger Cars-Mechanical Systems 6.2013-01-1929(2013), 1231-1238.
Sunny, Sanwar A. "Effect of turbulence in modeling the reduction of local drag forces in a computational automotive model." International Journal of Energy and Environment 2.6 (2011):1079-1100.
Gu et al. "Evaluation of Aerodynamic Noise Generated in a Miniature Car Using Numerical Simulation." SAE International Journal of Passenger Cars-Mechanical Systems 2. 2009-01-0478 (2009): 693-702.
Wikipedia, "Glossary of mathematical symbols," accessed Mar. 24, 2021.
Wikipedia, "Exterior algebra," accessed Mar. 24, 2021.
Leighton et al. "A Glossary of Terms for Fluid Mechanics", University of Notre Dame, 2015.
Oregon State University, Intermediate Fluid Mechanics Textbook, Chapter 1, § 2 Mathematical Tools, accessed Mar. 24, 2021.
Wang, YiPing, et al."Hybrid CFD/FEM-BEM simulation of cabin aerodynamic noise for vehicles traveling at high speed." Science China Technological Sciences 56.7 (2013), 1697-1708.
Phan, Vinh Long et al. "A CFD Analysis Method for Prediction of Vehicle Exterior Wind Noise." SAE International Journal of Passenger Cars-Mechanical Systems 10.2017-01-1539 (2017), 286-298.
Adrian, R. J, K. T. Christensen, and Z-C Liu "Analysis and interpretation of instantaneous turbulent velocity fields." Experiments in Fluids 29.3 (2000): 275-290.
Alfonsi, Giancarlo."Reynolds-Averaged Navier-Stokes Equations for Turbulence Modeling." Applied Mechanics Reviews, 62.4, (2009), 040802-1-040802-20.
Blanchet, D., and A.Golota. "Combining CFD/FEM/BEM/SEA to Predict Interior Vehicle Wind Noise-Validation Case CAA German Working Group." Proceedings of the Korean Society for Noise and Vibration Engineering Conference. The Korean Society for Noise and Vibration Engineering, 2014, 800-811.
Gümüs, Baran. Wind Noise Prediction of a Car Model Through Solutions of Navier-Stokes and FFOWCS Williams & Hawkings Equations, MS thesis. Middle East Technical University, 2017.
Gaylard, A. P. "CFD Simulation of Side Glass Surface Noise Spectra for a Bluff SUV." SAE Technical Paper Series (2006).
Hartmann, Michael, et al. "Wind Noise caused by the A-mirror and Side Mirror flow of a Generic Vehicle Model." 18th AIAA/CEAS Aeroacoustics Conference (33rd AIAA Aeroacoustics Conference), 2012.
Khalighi, Bahram, et al. "Simulations of flow and noise generated by automobile outside rear-view mirrors." International Journal of Aeroacoustics 11.1, (2012), 137-156.
Moron, Philippe, et al. "A CFD/SEA Approach for Prediction of Vehicle Interior Noise due to Wind Noise." No. 2009-01-2203 SAE Technical Paper, 2009.
Pitsch, "Turbulence" Lecture notes from the CEFRC Combustion Summer School, accessed Mar. 26, 2021.
Tulapurkara, Chapter 3, "Equations for turbulent flows," Turbulence, Dept. of Aerospace Engineering, Indian Institute of Technology, Madras, accessed Mar. 26, 2021.
Wang, Y. S., et al. "A hybrid prediction for wind buffeting noises of vehicle rear window based on LES-LAA method." Applied Mathematical Modelling, 47 (2017), 160-173.
Hamid et al. "Computational Analysis of Frontal Area of a Front Grill Passenger Car." Applied Mechanics and Materials vol. 315. Trans Tech Publications Ltd, 2013.
U.S. Appl. No. 16/414,351, filed May 16, 2019 in the name of Phan Vinh Long.
Sep. 21, 2021 Office Action issued in U.S. Appl. No. 16/414,351.
Alamshah, Vahid, et al., "Effects of turbulent flow characteristics on wind induced noise generation in shielded microphones." Proc. Acoust (2015): 1-11. (Year: 2015).
Karthik, K., et al., "Prediction of flow induced sound generated by cross flow past finite length circular cylinders." The Journal of the Acoustical Society of America 143.1 (2018): 260-270. (Year: 2018).
Soeta, Yoshiharu, et al., "Survey of interior noise characteristics in various types of trains." Applied Acoustics, vol. 74 .10 (2013): 1160-1166 (Year: 2013).
Zhao, Sipei, et al., "Estimation of the frequency boundaries of the inertial range for wind noise spectra in anechoic wind tunnels." 2nd Australasian Acoustical Societies Conference, ACOUSTICS 2016. 2016. (Year: 2016).
Jan. 11, 2022 Office Action issued in U.S. Appl. No. 16/414,351.

( $f_m$ = 1 kHz )

( $f_m$ = 1 kHz )

( PSD = $10^3$, $f_m$ = 1 kHz )

( PSD = $10^4$, $f_m$ = 1 kHz )

( PSD = $10^5$, $f_m$ = 1 kHz )

34 (INCLUDING EVALUATION POINT OF INTEREST z)

($f_m$ = 1 kHz)

($f_m$ = 500 Hz)

($f_m$ = 500 Hz)

($f_m$ = 1 kHz)

($f_m$ = 1 kHz)

WIND NOISE ANALYZER AND WIND NOISE ANALYSIS METHOD

INCORPORATION BY REFERENCE

The disclosure of Japanese Patent Application No. 2018-087378 filed on Apr. 27, 2018 including the specification, drawings and abstract is incorporated herein by reference in its entirety.

BACKGROUND

1. Technical Field

The present disclosure relates to a wind noise analyzer and a wind noise analysis method.

2. Description of Related Art

Research and development of a technology for reducing wind noise in a running vehicle are underway. For example, Japanese Patent Application Publication No. 2017-062727 discloses a technology in which "an amplitude of a pressure fluctuation" and "an average flow velocity" at an arbitrary position in a surface of a vehicle model are acquired by simulation involving causing the vehicle model to run, and based on these values, the intensity of a sound source of wind noise at the arbitrary position is calculated for each desired frequency band. Hereinafter, an amplitude of a pressure fluctuation on a surface of a vehicle model will also be referred to simply as a "surface pressure fluctuation."

SUMMARY

Here, of a surface pressure fluctuation and an average surface flow velocity, especially the surface pressure fluctuation is strongly correlated with the intensity of a sound source of wind noise. The surface pressure fluctuation varies under the influence of a flow field (typically, flow velocity and vorticity) around the vehicle. Therefore, to reduce wind noise at a certain position in a surface of the vehicle, it is necessary to identify which part of (position in) the flow field around the vehicle has a strong influence on the surface pressure fluctuation at that certain position, and to change the identified part of the flow field (i.e., change the shape of a component of the vehicle) so as to reduce the surface pressure fluctuation at that certain position. However, there is no standardized technique for "the method of identifying the part of the flow field that contributes significantly to the surface pressure fluctuation"; in reality, engineers identify such part of a flow field based on their own know-how and perception. This leads to a variation in the results of studies among engineers, which may necessitate a lot of trial and error.

The present disclosure provides a technology for appropriately identifying the position of a flow field around a structure, such as a vehicle, that contributes significantly to a surface pressure fluctuation of the structure.

A first aspect of the present disclosure is a wind noise analyzer including: an unsteady computational fluid dynamics calculation unit configured to execute an unsteady computational fluid dynamics simulation involving moving a structure model modeled on a structure, and calculate, for each of spatial nodes that are nodes inside a predetermined region of a flow field around the structure model, an average flow velocity and an average vorticity over a predetermined time in a flow field inside the predetermined region, and then calculate, for each of the spatial nodes, a value based on an amplitude of a turbulent flow velocity inside the predetermined region, in an angular frequency band of interest that is a target angular frequency band of a wind noise analysis; and a pressure source density calculation unit configured to calculate, based on the average flow velocity, the average vorticity, and the value based on the amplitude of the turbulent flow velocity calculated by the unsteady computational fluid dynamics calculation unit, a pressure source density that is an indicator of a degree of contribution of a flow field at a spatial node inside the predetermined region to a surface pressure fluctuation that is an amplitude of a pressure fluctuation at a target point of the wind noise analysis in a surface of the structure model.

The wind noise analyzer according to the aspect of the present disclosure calculates the pressure source density based on the physical quantities (average flow velocity, average vorticity, and turbulent flow velocity) calculated by an unsteady CFD simulation involving moving a structure model. This pressure source density is an indicator of the degree of contribution of "the flow field at a spatial node inside the predetermined region" to "the surface pressure fluctuation at the analysis target point in the surface of the structure model." Here, the predetermined region is a part of the flow field around the structure model, and is a region specified as a region that can influence the surface pressure fluctuation at the analysis target point. By using the pressure source density as an indicator, therefore, one can calculate the degree of contribution of the flow field to the surface pressure fluctuation for each spatial node. Accordingly, it is possible to appropriately identify the position of the flow field inside the predetermined region that contributes significantly to the surface pressure fluctuation of the structure model at the analysis target point. The surface pressure fluctuation is strongly correlated with wind noise: the larger the surface pressure fluctuation, the louder the wind noises. Thus, in a broad sense, analyzing the surface pressure fluctuation is synonymous with analyzing the wind noise. A pressure fluctuation is composed of a fluid flow pressure fluctuation and a sound pressure. The surface pressure fluctuation in this specification is synonymous with the fluid flow pressure fluctuation of the two.

In the above aspect, a value obtained by spatially integrating the pressure source density at the analysis target point in the surface of the structure model with respect to the predetermined region may be an approximate value of a value obtained by integrating a product of a function of the surface pressure fluctuation at the analysis target point and a complex conjugate function of that function with respect to the angular frequency band of interest.

According to this aspect, the behavior of the pressure source density matches the behavior of the surface pressure fluctuation of the structure model with good accuracy. This means that the pressure source density is highly reliable as an indicator of the degree of contribution of a flow field to a surface pressure fluctuation. Accordingly, the position of a flow field around a structure that contributes significantly to a surface pressure fluctuation of the structure can be identified with good accuracy.

In the above aspect, the wind noise analyzer may further include a causal parameter identification unit that identifies a causal parameter that is a parameter contributing relatively significantly to the pressure source density among a plurality of parameters composing the pressure source density.

According to this aspect, a parameter responsible for the high PSD can be easily ascertained, so that the shape of the structure model can be studied and changed more efficiently.

In the above aspect, the parameters may be the average flow velocity, the average vorticity, and the turbulent flow velocity.

In the above aspect, the wind noise analyzer may further include an image processing unit configured to: extract, from a plurality of spatial nodes for which the pressure source density has been calculated, a plurality of spatial nodes corresponding to a pressure source density having a value input from outside; create a plane of equivalent values by performing image processing on the extracted spatial nodes; and visualize the plane of equivalent values.

According to this aspect, a plane of equivalent PSD values is displayed. Thus, by appropriately setting an input value, an operator can view a plane of equivalent values having a desired PSD value. As a result, a spatial node corresponding to the desired PSD value can be efficiently selected, and the position of the flow field around the structure that contributes significantly to the surface pressure fluctuation of the structure can be efficiently identified.

In the above aspect, the wind noise analyzer may further include a spatial node extraction unit configured to extract a spatial node corresponding to a maximum value of a plurality of pressure source densities calculated by the pressure source density calculation unit.

According to this aspect, the need for the operator to select a spatial node corresponding to a maximum PSD value is eliminated, so that the position of the flow field around the structure that contributes significantly to the surface pressure fluctuation of the structure can be identified more efficiently. In a broad sense, "a maximum value of the pressure source density" means "a substantially maximum value of the pressure source density."

In the above aspect, the unsteady computational fluid dynamics calculation unit may be configured to calculate, for each of surface nodes that are nodes on a surface of the structure model, the surface pressure fluctuation on the surface in the angular frequency band of interest.

According to this aspect, the analysis target point can be selected based on the surface pressure fluctuation. The surface pressure fluctuation is strongly correlated with wind noise. Therefore, wind noise can be analyzed more appropriately.

In the above aspect, a calculation formula of the pressure source density may be defined by the following expression:

$$PDS(x, z) = \frac{\rho^2 \|\overline{\tilde{u}_\theta}\|}{12\pi^2 r^6} \left\{ \left(k\frac{\theta_n}{U}\right)^2 \times |\overline{U} \wedge \vec{r}|^2 + |\vec{\Omega} \wedge \vec{r}|^2 \right\} V_{z,cr}$$

where PDS is a pressure source density; x is an analysis target point; z is a spatial node; ρ is a flow field density; $\|\overline{\tilde{u}_\theta}\|$ is a value obtained by integrating a product of a function of an amplitude of a turbulent flow velocity and a complex conjugate function of that function with respect to an angular frequency band of interest; r is a distance between x and z; k is a constant; $\theta_m$ is a center angular frequency of the angular frequency band of interest; $\overline{U}$ is an average flow velocity; $\vec{r} = \vec{z} - \vec{x}$; $\vec{\Omega}$ is an average vorticity; and $V_{z,cr}$ is a correlation volume including z.

A second aspect of the present disclosure is a wind noise analysis method including: executing an unsteady computational fluid dynamics simulation involving moving a structure model modeled on a structure, and calculating, for each of spatial nodes that are nodes inside a predetermined region of a flow field around the structure model, an average flow velocity and an average vorticity over a predetermined time in a flow field inside the predetermined region, and then calculating, for each of the spatial nodes, a value based on an amplitude of a turbulent flow velocity inside the predetermined region, in an angular frequency band of interest that is a target angular frequency band of a wind noise analysis; and calculating, based on the average flow velocity, the average vorticity, and the value based on the amplitude of the turbulent flow velocity, a pressure source density that is an indicator of a degree of contribution of a flow field at a spatial node inside the predetermined region to a surface pressure fluctuation that is an amplitude of a pressure fluctuation at a target point of the wind noise analysis in a surface of the structure model.

This wind noise analysis method can appropriately identify the position of the flow field inside the predetermined region that contributes significantly to the surface pressure fluctuation of the structure model at the analysis target point.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overview of Device of Embodiment

First, an overview of a wind noise analyzer according to an embodiment (hereinafter also referred to as "the device of the embodiment") will be described. Wind noise occurring in a running vehicle is strongly correlated with an amplitude of a pressure fluctuation on a surface of the vehicle (surface pressure fluctuation). The surface pressure fluctuation varies under the influence of a flow field (flow velocity and vorticity) around the vehicle. In the device of the embodiment, a formula for calculating an indicator that quantitatively indicates a relation between the flow field around the vehicle and the surface pressure fluctuation (in other words, an indicator of how much "(a state of) the flow field at an arbitrary position around the vehicle" contributes to "the surface pressure fluctuation at an arbitrary position in the surface of the vehicle") is stored in advance. A larger value of the indicator means a higher degree of contribution. Using an unsteady CFD (computational fluid dynamics) calculation, the device of the embodiment calculates the surface pressure fluctuation of a running vehicle model at each position in a surface of the vehicle model and in each frequency band. Based on the calculation result, an operator selects a position at which the surface pressure fluctuation is relatively large (in other words, a position at which a cause for loud wind noise lies). Based on the formula for calculating the aforementioned indicator, the device of the embodiment calculates, for each position in the flow field, "an indicator of the degree of contribution of the flow field to the surface pressure fluctuation at the selected position." The vehicle model corresponds to an example of the "structure model."

Based on the calculation result, the operator selects a position at which the value of the indicator is relatively large (in other words, a position at which the degree of contribution to the surface pressure fluctuation at the selected position is relatively high), and identifies a physical quantity responsible for the large value of the indicator among physical quantities (typically, average flow velocity, turbulent flow velocity, and average vorticity) composing the indicator at the selected position of the flow field. Based on the value of the identified physical quantity, the operator studies and changes the shape of the vehicle model such that the indicator value at the selected position of the flow field decreases. In this configuration, changing the shape of the vehicle model so as to reduce the indicator value can reduce "the degree of contribution of the flow field at the position having that indicator value to the surface pressure fluctuation at the selected position." Thus, the surface pressure fluctuation at the selected position can be reduced, and consequently wind noise reduction can be realized.

Specific Configuration of Device of Embodiment

Figure 1:
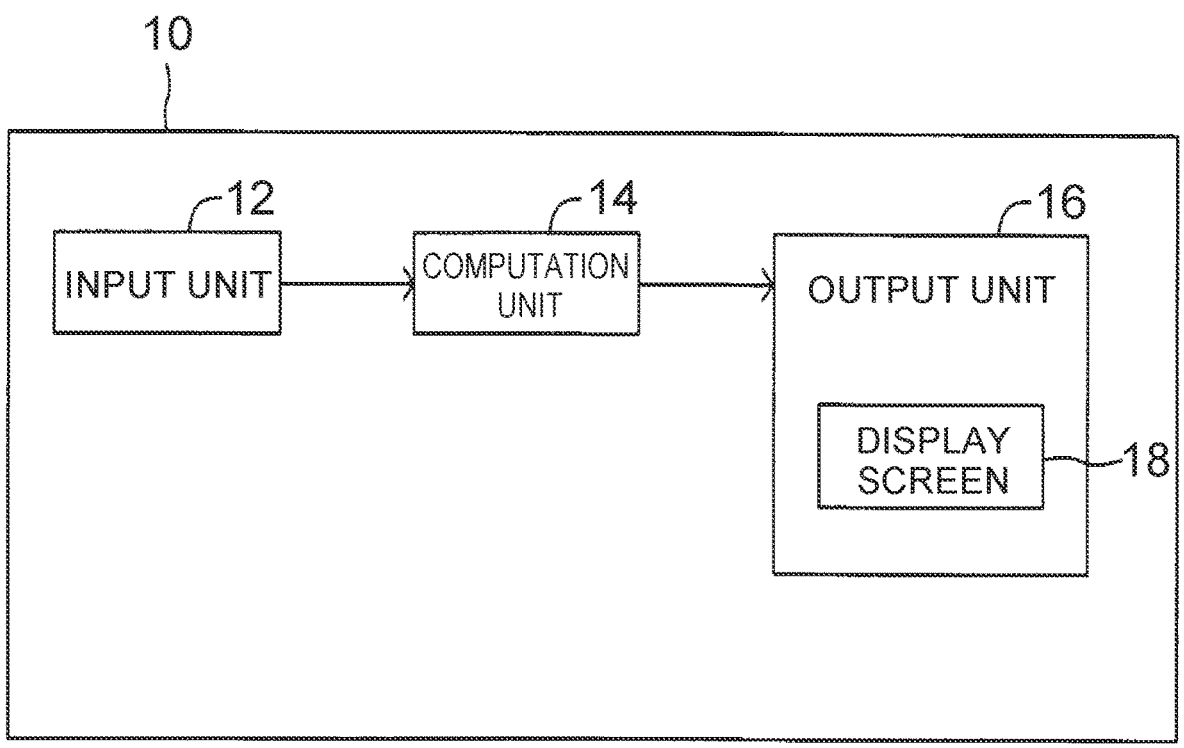
FIG. 1 is a block diagram showing a calculation device included in a wind noise analyzer according to an embodiment of the present disclosure (hereinafter referred to as "the device of the embodiment")

In the following, the device of the embodiment will be specifically described with reference to the drawings. As shown in FIG. 1, the device of the embodiment includes a calculation device 10. The calculation device 10 has an input unit 12, a computation unit 14, and an output unit 16. The output unit 16 has a display screen 18 at such a position that an operator can view the display screen 18. The input unit 12 is used to input data on a three-dimensional model of a vehicle that is a target of a wind noise analysis, data on a flow domain representing an analysis range, data required for an unsteady CFD simulation, etc. The input unit 12 is also used to input data on coordinates, a reference value of the indicator, a causal parameter, etc. that are selected by the operator in the course of a process, as will be described later.

Figure 2A:
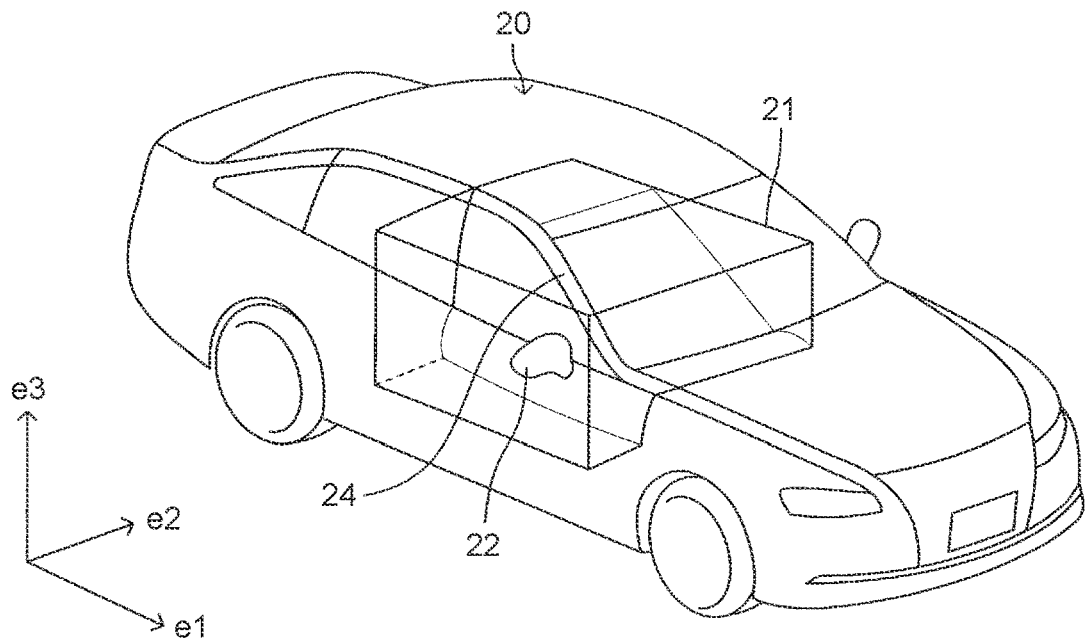
FIG. 2A is a schematic view of a vehicle model and a flow domain that are a target of an unsteady CFD simulation.

FIG. 2A is a view schematically showing a three-dimensional vehicle model 20 (hereinafter referred to simply as a "vehicle model 20") and a flow domain 21. As shown in FIG. 2A, a spatial coordinate system of the vehicle model 20 is defined by axes e1, e2, and e3, and is set such that a direction toward a front side of the vehicle model 20 in a front-rear direction coincides with a +e1 direction and that a direction toward a left side of the vehicle model 20 in a left-right direction coincides with a +e2 direction. The origin is set at a position separated from a reference point (e.g., the center of gravity) of the vehicle model 20 by a predetermined distance (including the value zero) in a predetermined direction.

The flow domain 21 is a region representing a range which covers a part of a surface of the vehicle model 20 and a space around the vehicle model 20 and within which an unsteady CFD calculation is executed. In this embodiment, an evaluation of wind noise occurring in the vicinity of a right side mirror 22 and a right front pillar 24 of the vehicle model 20 is performed. Therefore, the flow domain 21 is set as "a region including surfaces of these members 22, 24, and also including such a part of the flow field around the vehicle model 20 that can influence the surface pressure fluctuation in the vicinity of the members 22, 24." Specifically, the flow domain 21 has a shape of a substantially rectangular prism space including the right side mirror 22, the right front pillar 24, a front door glass, a right half of a windshield glass, etc., with a portion occupied by the vehicle model 20 hollowed out from the space. The flow domain 21 can be freely set according to the position in the vehicle model 20 at which the wind noise analysis is performed. The flow domain 21 corresponds to an example of the "predetermined region."

Those pieces of data input through the input unit 12 are stored in an RAM (to be described later) of the computation unit 14. Hereinafter, an unsteady CFD calculation will also be referred to simply as a "CFD calculation."

Turning back to FIG. 1, the description continues. The computation unit 14 has, as a main component, a microcomputer composed of a CPU, ROM, RAM, etc. The computation unit 14 has various interfaces, through which the computation unit 14 is connected to the input unit 12 and the output unit 16 so as to be able to input and output signals.

By using the above data stored in the RAM, the computation unit 14 executes an unsteady CFD simulation involving causing the vehicle model 20 to run. CFD calculation processes include a time history data calculation process, an averaging process, and a fast Fourier transform process. These calculation processes are performed within the range defined by the flow domain 21. A specific description follows.

CFD Calculation Processes

1. Time History Data Calculation Process

The computation unit 14 calculates pressure fluctuation time history data p (x, t) (t: time) for a predetermined time, for each surface node x (hereinafter referred to simply as a "node x") in a part of a surface of the vehicle model 20 that is in contact with the flow domain 21 (which part of the surface will be hereinafter also referred to as an "analysis surface"). The analysis surface is a surface including the right side mirror 22, the right front pillar 24, the front door glass, the right half of the windshield glass, etc. While a part of a roof is also in contact with the flow domain 21, this part is excluded from the analysis surface. The computation unit 14 stores the pressure fluctuation time history data p (x, t) in the RAM thereof, in association with the coordinates of the node x and the time t.

Figure 2B:
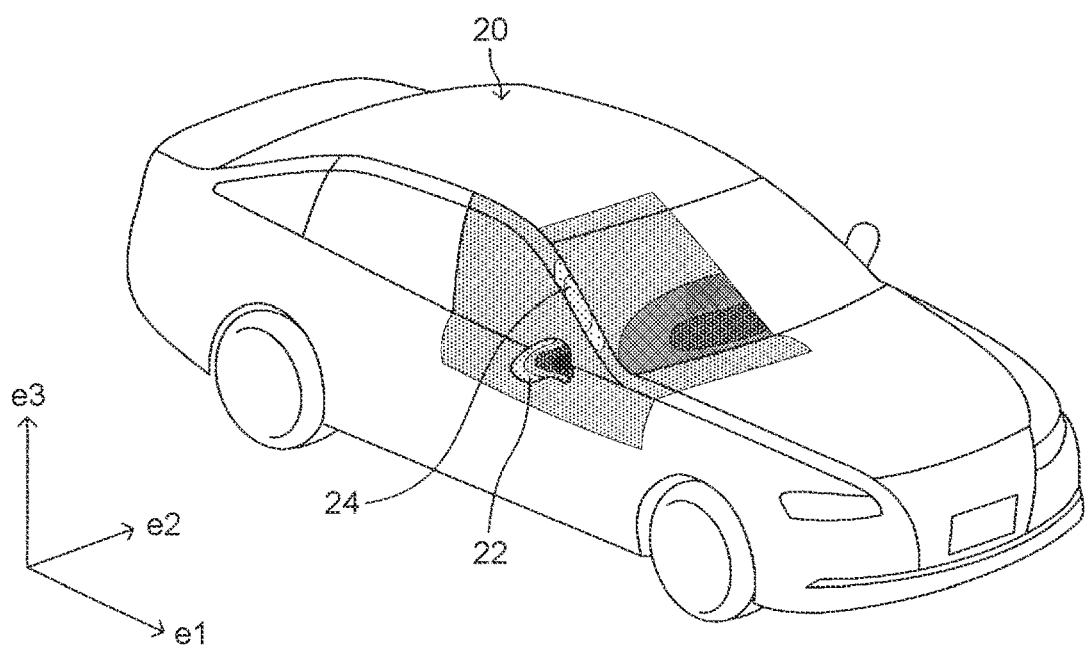
FIG. 2B is a view showing pressure fluctuation time history data at time t1 plotted on the vehicle model.

FIG. 2B is a view showing the pressure fluctuation time history data p (x, t1) at time t1 (i.e., the amplitude of the pressure fluctuation at each node x at time t1) plotted on the vehicle model 20. A darker shade represents a larger amplitude of the pressure fluctuation. According to FIG. 2B, at time t1, the pressure fluctuation is relatively large at a vehicle body-side part of the right side mirror 22 and at a lower central part of the windshield glass. The computation unit 14 creates, for each time t within the predetermined time, data in which the amplitude of the pressure fluctuation at each node x is given corresponding color data, and transmits, to the output unit 16, a display command to display the created data as an animation on the display screen 18 of the output unit 16. Upon receiving the display command, the output unit 16 displays the data as an animation on the display screen 18. Thus, the operator can grasp changes in the pressure fluctuation over the predetermined time.

Moreover, the computation unit 14 calculates, for each spatial node z inside the flow domain 21, flow velocity time history data u (z, t) and vorticity time history data ω (z, t) on the flow field for the predetermined time. Hereinafter, the spatial node z will be referred to simply as a "node z." The position of the node z inside the flow domain 21 is set in advance such that the node z is not located on the analysis surface (i.e., such that the node z is separated from the analysis surface). The computation unit 14 stores the flow velocity time history data u (z, t) and the vorticity time history data ω (z, t) in the RAM thereof, in association with the coordinates of the node z and the time t.

2. Averaging Process

The computation unit 14 calculates, for each node z inside the flow domain 21, an average flow velocity U-(z) and an average vorticity Ω-(z) by performing the averaging process on each of the flow velocity time history data u (z, t) and the vorticity time history data ω (z, t) stored in the RAM. The sign "-" in both U-(z) and Ω-(z) denotes an average and substitutes for the bar attached over the symbol U or Ω in expressions to be described later. The computation unit 14 stores the average flow velocity U-(z) and the average vorticity Ω-(z) in the RAM thereof, in association with the coordinates of the node z. As will be described later, the average flow velocity U-(z) and the average vorticity Ω-(z) are used to calculate the indicator.

3. Fast Fourier Transform Process

The computation unit 14 calculates, for each node x in the analysis surface, a pressure fluctuation amplitude $p_\theta$ (x) (i.e., a surface pressure fluctuation $p_\theta$ (x)) at each frequency (angular frequency) (θ: angular frequency; $\theta=2\pi f$) by performing the fast Fourier transform (FFT) process on the pressure fluctuation time history data p (x, t) stored in the RAM. The surface pressure fluctuation $p_\theta$ (x) is calculated in a frequency band that is a target of a wind noise evaluation (which frequency band will be hereinafter also referred to as a "frequency band of interest"). The frequency band of interest can be selected by the operator, and for example, a frequency band of which a center frequency $f_m$ is 500 Hz, 1 kHz, 2 kHz, or 4 kHz can be selected. Hereinafter, a frequency band of which the center frequency $f_m$ is nHz will be referred to simply as an "nHz frequency band."

For example, when 1 kHz (with a lower limit frequency $f_l$=710 Hz and an upper limit frequency $f_h$=1420 Hz) is selected as the frequency band of interest, the surface pressure fluctuation $p_\theta$ (x) is calculated for each node x in the analysis surface within the range from 710 Hz to 1420 Hz. The computation unit 14 stores the surface pressure fluctuation $p_\theta$ (x) in the RAM thereof, in association with the coordinates of the node x and the angular frequency θ. As will be described later, the surface pressure fluctuation $p_\theta$ (x) is used to create a distribution map of the surface pressure fluctuation $p_\theta$ (x) at the center frequency $f_m$ of the frequency band of interest.

Moreover, the computation unit 14 calculates, for each node z inside the flow domain 21, an autocorrelation function of a turbulent flow velocity (to be exact, the amplitude of the turbulent flow velocity) u~$_\theta$ (z) in the frequency band of interest by performing the fast Fourier transform process on the flow velocity time history data u (z, t) stored in the RAM. The sign "~" in u~$_\theta$ (z) denotes a turbulent component resulting from the averaging process on the flow velocity u, and substitutes for a tilde attached over the symbol u in expressions to be described later. The autocorrelation function of an arbitrary function $F_\theta$ is defined by the following Expression (1):

$$\|F_\theta\|=\int_{\theta_l}^{\theta_h} F_\theta F_\theta^* d\theta \qquad (1)$$

Here, $\theta_l$ and $\theta_h$ in the above Expression (1) respectively denote the lower limit angular frequency and the upper limit angular frequency of the angular frequency band of interest, and $F_\theta^*$ denotes a complex conjugate of the function $F_\theta$. Thus, in this specification, the autocorrelation function is defined as "a value obtained by integrating the product (to be described later) of the arbitrary function $F_\theta$ and the complex conjugate function $F_\theta^*$ thereof with respect to the angular frequency band of interest."

The computation unit 14 stores the autocorrelation function of the turbulent flow velocity u~$_\theta$ (z) in the RAM thereof, in association with the coordinates of the node z. As will be described later, the autocorrelation function of the turbulent flow velocity u~$_\theta$ (z) is used to calculate the indicator. The computation unit 14 executes the above-described processes as the CFD calculation.

Surface Pressure Fluctuation Display Command

Upon completing the CFD calculation, the computation unit 14 extracts "the surface pressure fluctuations $p_\theta$ (x) at the center frequency $f_m$ at the nodes x" from "the surface pressure fluctuations $p_\theta$ (x) in the frequency band of interest at the nodes x" stored in the RAM. Then, the computation unit 14 creates, for each node x, "data in which the extracted surface pressure fluctuation $p_\theta$ (x) is given corresponding color data according to the level of the fluctuation," and transmits, to the output unit 16, a display command to display the created data as an image on the display screen 18. A larger surface pressure fluctuation $p_\theta$ (x) is given corresponding darker color data. Upon receiving the display command, the output unit 16 displays the data as an image on the display screen 18.

Figure 3A:
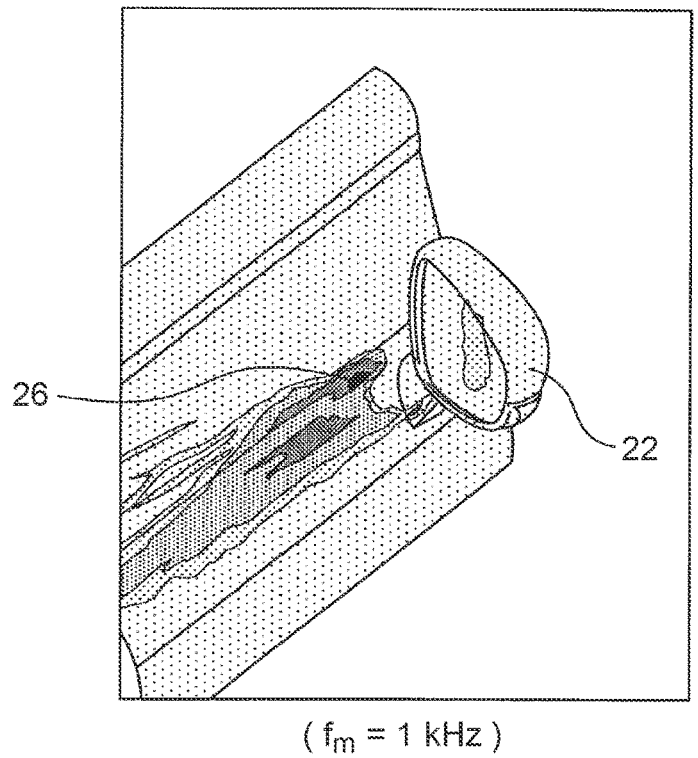
FIG. 3A is a distribution map of a surface pressure fluctuation on an analysis surface of the vehicle model.

FIG. 3A is an example of the distribution map of the surface pressure fluctuation $p_\theta$ (x) displayed as an image on the display screen 18 based on the display command. The frequency band of interest is set to 1 kHz (i.e., $f_m$=1 kHz). In this example, only a part of the analysis surface in the vicinity of the right side mirror 22 is displayed. Based on this distribution map, the operator selects a node x at which the surface pressure fluctuation $p_\theta$ (x) is relatively large. According to FIG. 3A, when the frequency band of interest is 1 kHz, the surface pressure fluctuation $p_\theta$ (x) is remarkable in a region 26 in the vicinity of the right side mirror 22, and therefore the operator selects an arbitrary node among the nodes x inside the region 26. Subsequently, the operator calculates an indicator for this node for the purpose of reducing the surface pressure fluctuation at this node, as will be described later, and changes the shape of the vehicle model 20 and observes the behavior of the surface pressure fluctuation at this node. Therefore, the selected node will be hereinafter also referred to as an "observation point x" (see FIG. 3B). The observation point x represents "a position in the analysis surface at which a cause for loud wind noise in the frequency band of interest lies." When the observation point x has been selected by the operator, coordinate data on the observation point x is input through the input unit 12. The input coordinate data is stored in the RAM of the computation unit 14. The observation point x corresponds to an example of the "analysis target point."

Calculation of PSD

In the RAM of the computation unit 14, a formula for calculating an indicator that quantitatively indicates a relation between the flow field inside the flow domain 21 and the surface pressure fluctuation at the observation point x (in other words, an indicator of how much "(a state of) the flow field at an arbitrary node z inside the flow domain 21" contributes to "the surface pressure fluctuation $p_\theta$ (x) at the observation point x") is stored in advance. This indicator can be calculated for each node z inside the flow domain 21. As will be described later, a value obtained by spatially integrating this indicator with respect to all the nodes z inside the flow domain 21 is an approximate value of "the autocorrelation function of the surface pressure fluctuation $p_\theta$ (x) at the observation point x." Thus, the value of the indicator at each node z can be interpreted as representing a value of "the autocorrelation function of the surface pressure fluctuation $p_\theta$ (x) at the observation point x" per unit volume of the flow domain 21. Therefore, the indicator at each node z will be hereinafter also referred to as "a pressure source density (PSD)." The PSD (x, z) is an indicator of the degree of contribution of "the flow field at an arbitrary node z inside the flow domain 21" to "the surface pressure fluctuation $p_\theta$ (x) at the observation point x," and a larger value of the PSD means a higher degree of contribution. The notation and the derivation method of the PSD calculation formula will be described later.

Based on the PSD calculation formula stored in the RAM, the computation unit 14 calculates the PSD (x, z) for each node z inside the flow domain 21. Since the value of the PSD (x, z) is evaluated for each node z, the node z will be hereinafter also referred to as an "evaluation point z." The computation unit 14 stores the value of the PSD (x, z) in the RAM thereof, in association with the coordinates of the observation point x and the coordinates of the evaluation point z. As will be described later, the PSD is used to create a plane of equivalent PSD values having a value set by the operator.

Plane-Of-Equivalent-PSD-Values Display Command

Upon completing the PSD calculation, the computation unit 14 extracts the coordinates of the evaluation points z associated with the PSD (x, z) having an arbitrary value (hereinafter also referred to as a "reference value") set by the operator, among the PSDs (x, z) stored in the RAM. Then, the computation unit 14 creates plane-of-equivalent-values data showing a plane of equivalent values that connects the extracted evaluation points z to one another, and transmits, to the output unit 16, a display command to display the created plane-of-equivalent-values data as an image on the display screen 18. Upon receiving the display command, the output unit 16 displays "the data on the plane of equivalent PSD values having the reference value" as an image on the display screen 18. Thus, upon completing the PSD calculation, the computation unit 14 causes a message indicating the completion to be displayed on the display screen 18, to let the operator know that the PSD calculation has been completed. Accordingly, the operator inputs an arbitrary reference value. The computation unit 14 repeatedly performs the process of transmitting the display command, each time the reference value is input by the operator.

Figure 3B:
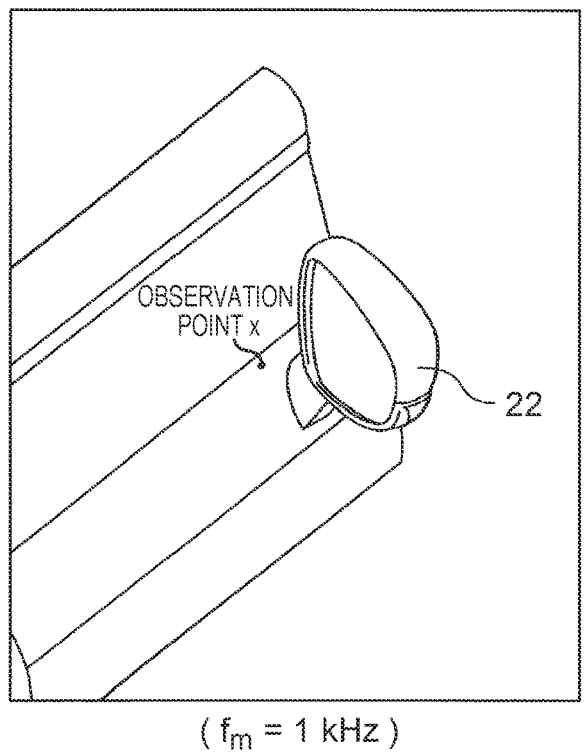
FIG. 3B is a view showing the position of an observation point that is a target of a surface pressure fluctuation (wind noise) analysis.
Figure 4A:
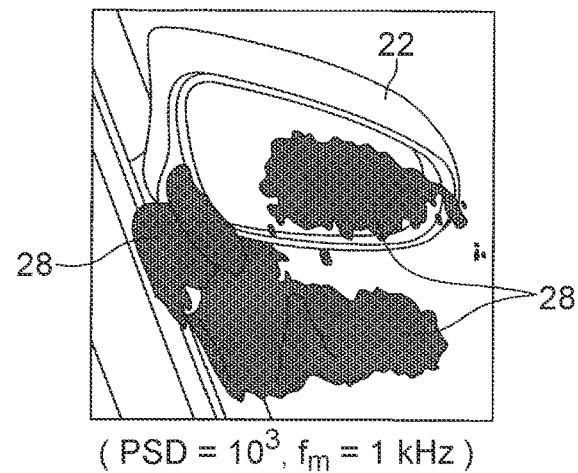
FIG. 4A is a view used to describe how to select an evaluation point of interest, and is a view showing a plane of equivalent values having a PSD reference value of $10^3$.
Figure 4B:
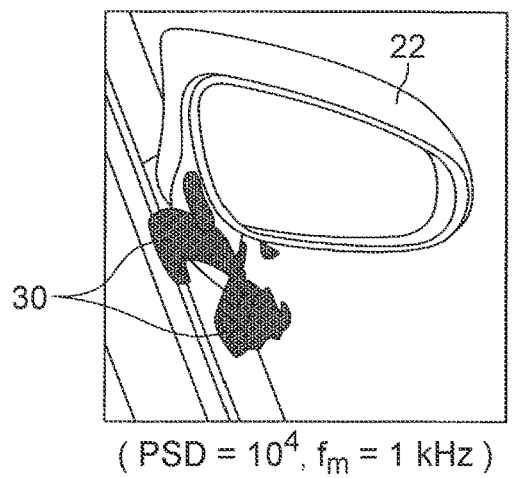
FIG. 4B is a view showing a plane of equivalent values having a PSD reference value of $10^4$.
Figure 4C:
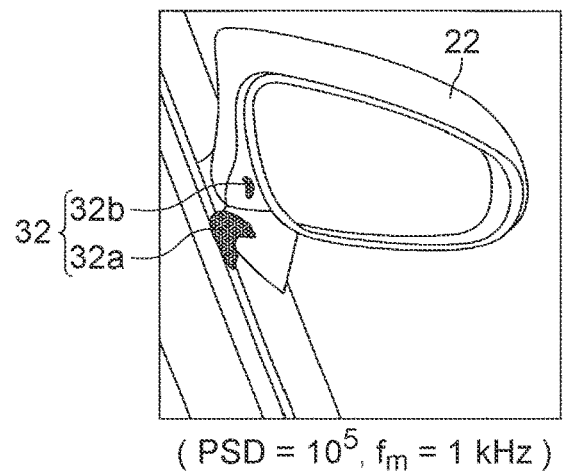
FIG. 4C is a view showing a plane of equivalent values having a PSD reference value of $10^5$.

FIG. 4A to FIG. 4C show planes of equivalent PSD values having different reference values. FIG. 4A shows a plane of equivalent values 28 having a reference value of $10^3$; FIG. 4B shows a plane of equivalent values 30 having a reference value of $10^4$; and FIG. 4C shows a plane of equivalent values 32 having a reference value of $10^5$. In all these cases, the frequency band of interest is set to 1 kHz. As shown in FIG. 4A to FIG. 4C, all the planes of equivalent values 28, 30, 32 are closed curved planes. In addition, the planes of equivalent values 28, 30, 32 each have a plurality of separate planes of equivalent values. The PSD (x, z) has the property of increasing as a distance r from the observation point x (see FIG. 3B) to the evaluation point z decreases. In other words, the value of the PSD increases as the evaluation point z is moved closer to the observation point x. Accordingly, as shown in FIG. 4A to FIG. 4C, the surface areas of the planes of equivalent values 28, 30, 32 decrease as the reference value increases. Moreover, the plane of equivalent values 30 is included in the plane of equivalent values 28, and the plane of equivalent values 32 is included in the plane of equivalent values 30. Thus, one plane of equivalent values having a certain reference value includes another plane of equivalent values having a larger reference value. Therefore, as the reference value increases gradually, the surface area of the plane of equivalent values decreases gradually, and so does the number of planes of equivalent values, which reaches two at some point in time.

FIG. 4C shows an example of this case. As shown in FIG. 4C, the plane of equivalent values 32 has two planes of equivalent values 32a, 32b. Referring to FIG. 3B, the plane of equivalent values 32a is located closer to (i.e., at a shorter distance r from) the observation point x than the plane of equivalent values 32b is. Therefore, it can be said that the PSD of the plane of equivalent values 32a is more strongly influenced by the distance r than the PSD of the plane of equivalent values 32b is (i.e., the degree of contribution of the distance r to the PSD value is higher in the plane of equivalent values 32a than in the plane of equivalent values 32b). Here, the PSD (x, z) has the following physical quantities as parameters: the average flow velocity $\bar{U}(z)$, the turbulent flow velocity $\tilde{u}_\theta(z)$, and the average vorticity $\bar{\Omega}(z)$. The value of the PSD becomes larger as these physical quantities become larger. Therefore, the reason why "the plane of equivalent values 32b located at a longer distance r than the plane of equivalent values 32a" has the same PSD value as the plane of equivalent values 32a, can be interpreted as because the PSD of the plane of equivalent values 32b is strongly influenced by at least one of the above physical quantities ($\bar{U}(z)$, $\tilde{u}_\theta(z)$, and $\bar{\Omega}(z)$) than the PSD of the plane of equivalent values 32a is (i.e., the degree of contribution of the physical quantity to the PSD value is higher in the plane of equivalent values 32b than in the plane of equivalent values 32a).

Accordingly, the operator selects an arbitrary evaluation point z in the plane of equivalent values 32b having "the PSD more strongly influenced by the physical quantity than by the distance r" as the evaluation point z at which the PSD value is relatively large (substantially maximum). Hereinafter, the evaluation point z will also be referred to as an "evaluation point of interest z" (see FIG. 5A). The evaluation point of interest z represents "the position of a flow field inside the flow domain 21 that has a relatively high (substantially maximum) degree of contribution to the surface pressure fluctuation at the observation point x." When the evaluation point of interest z has been selected by the operator, the input unit 12 inputs coordinate data on the evaluation point of interest z. The input coordinate data is stored in the RAM of the computation unit 14.

PSD Parameter Display Command

The computation unit 14 selects the average flow velocity $\bar{U}(z)$, the turbulent flow velocity $\tilde{u}_\theta(z)$, and the average vorticity $\bar{\Omega}(z)$ from the plurality of parameters (physical quantities) composing the PSD (x, z) at the evaluation point of interest z stored in the RAM, and transmits, to the output unit 16, a display command to display numerical data on these parameters on the display screen 18. Upon receiving the display command, the output unit 16 displays the numerical data on the selected parameters on the display screen 18. Based on the displayed numerical data, the operator identifies a parameter that contributes relatively significantly to the PSD value (i.e., a parameter responsible for the large PSD value) among these parameters. In this case, numerical data on the parameters composing the PSD at another evaluation point z may be displayed as necessary. The operator may identify the parameter by comparing these pieces of numerical data. When the parameter has been identified by the operator, the identified parameter is input through the input unit 12. The input parameter is stored in the RAM of the computation unit 14. Hereinafter, this parameter will also be referred to as a "causal parameter."

Physical Quantity Distribution Map Display Command

The computation unit 14 extracts a group of evaluation points z located in "a plane (see dashed line L in FIG. 5A) that passes through the evaluation point of interest z and is parallel to the e1-e2 plane (see FIG. 2A)" from the coordinate data on the group of evaluation points z stored in the RAM. Then, the computation unit 14 creates distribution map data showing a distribution map of the causal parameter associated with the extracted group of evaluation points z, and transmits, to the output unit 16, a display command to display the created distribution map data as an image on the display screen 18. Upon receiving the display command, the output unit 16 displays the data as an image on the display screen 18.

Figure 5A:
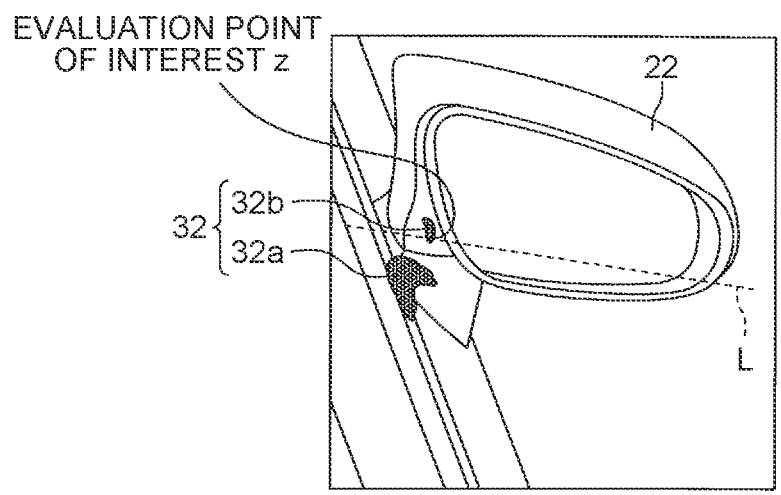
FIG. 5A is a view showing the position of a plane for which a distribution map of a causal parameter (turbulent flow velocity) is created.
Figure 5B:
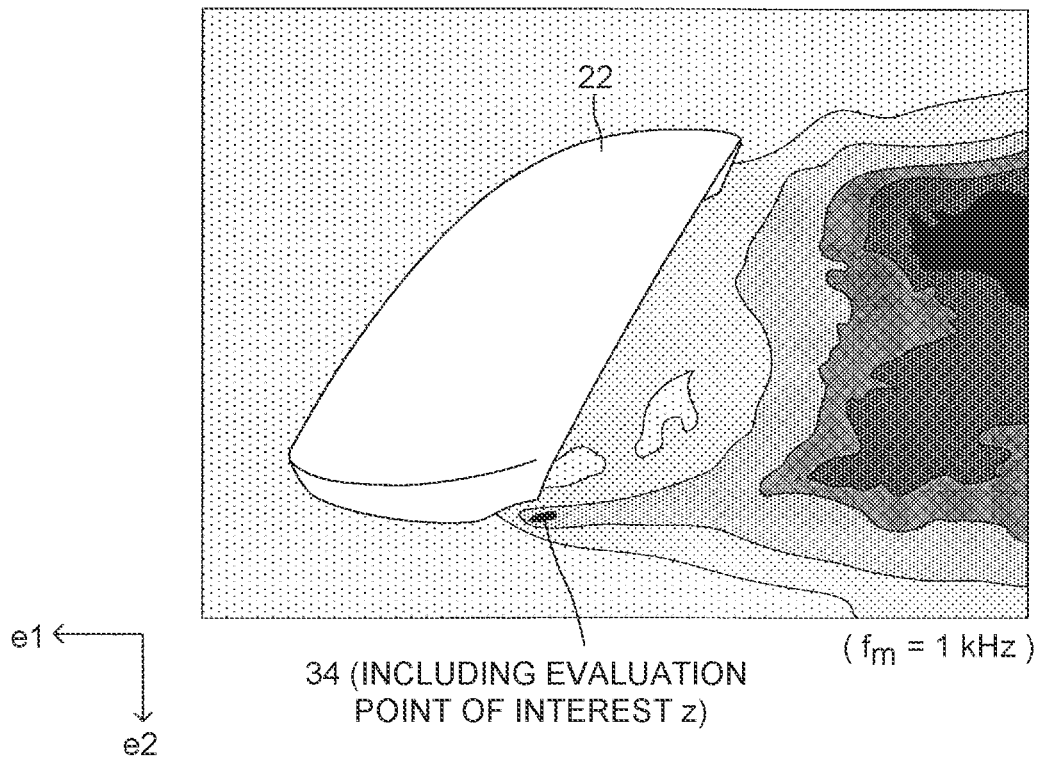
FIG. 5B is a distribution map of a flow velocity level of a turbulent flow velocity.

FIG. 5B shows a distribution map of a flow velocity level (dB) of the turbulent flow velocity $\tilde{u}_\theta(z)$ in the case where the turbulent flow velocity $\tilde{u}_\theta(z)$ has been identified as the causal parameter. A darker shade represents a higher flow velocity level. Since in this example the evaluation point of interest z is located in the vicinity of the right side mirror 22 as shown in FIG. 5A, only the right side mirror 22 and a surrounding part are set as the range of the distribution map. An image of the right side mirror 22 in a plan view of the vehicle model 20 is inset at the position of the right side mirror 22. The evaluation point of interest z is included in a region 34 of FIG. 5B.

Based on the distribution map, the operator analyzes the cause for the large value of the causal parameter (in this example, the turbulent flow velocity $\tilde{u}_\theta(z)$) at the evaluation point of interest z. In the example of FIG. 5B, the turbulent flow velocity $\tilde{u}_\theta(z)$ in the region 34 is remarkable in the vicinity of the right side mirror 22. A possible explanation for this is that an airflow is separated in the region 34 while the vehicle is running. Therefore, the operator studies and changes the shape of the right side mirror 22 so as to be able to reduce the likelihood of separation of an airflow in the region 34. A specific improvement effect on the surface pressure fluctuation $p_\theta(x)$ resulting from the shape change will be described later.

The output unit 16 receives display commands from the computation unit 14 and displays various types of data on the display screen 18. The details are as described above. This concludes the description of the specific configuration of the device of the embodiment.

Derivation of PSD Calculation Formula

Next, a method of deriving a formula for calculating the above-described PSD will be described by using a rigid body model. The PSD is defined based on a formula obtained by converting "an expression of a relation between a surface pressure fluctuation of a rigid body model and a flow field around the rigid body model," which is calculated based on the publicly known Powell's formula, from a time domain into a frequency domain. The Powell's formula is expressed in a form suitable for the derivation of the PSD calculation formula. In the following, therefore, the rigid body model and the flow domain will be first described with reference to FIG. 6, and then the derivation of the Powell's formula in the form suitable for the derivation of the PSD calculation formula will be described. Thereafter, the derivation of an expression of a relation between the surface pressure fluctuation and the flow field in the time domain will be described, and then the derivation of the PSD calculation formula will be described.

Rigid Body Model and Flow Domain

Figure 6:
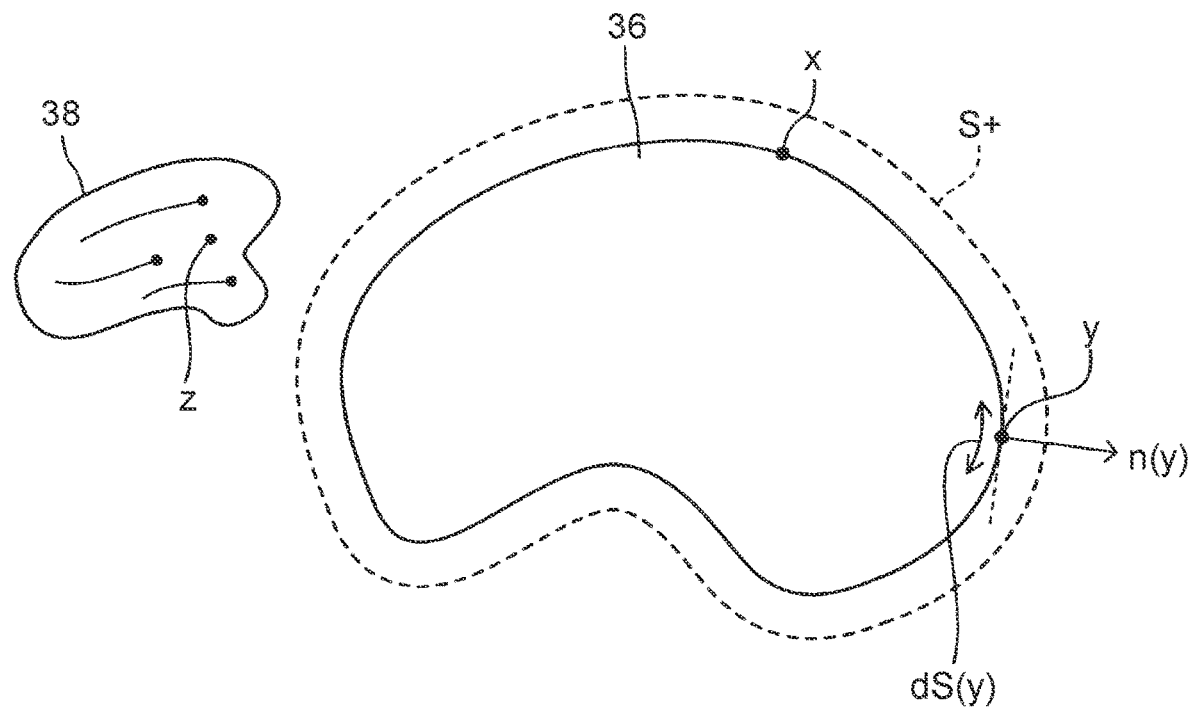
FIG. 6 is a view used to describe how to derive a PSD calculation formula, and is a schematic view of a rigid body model and a flow domain.

FIG. 6 shows a schematic view of a rigid body model 36 and a flow domain 38. The rigid body model 36 (hereinafter also referred to simply as a "rigid body 36") has the observation point x on a surface S thereof. The flow domain 38 is a part of a flow field around the rigid body 36 that can influence the surface pressure fluctuation at the observation point x. There is a plurality of evaluation points z inside the flow domain 38. The PSD (x, z) is an indicator of the degree of contribution of the flow field at the evaluation point z to the surface pressure fluctuation at the observation point x. Other symbols in FIG. 6 will be described later.

Derivation of Powell's Formula

The following Expression (2) shows the Navier-Stokes equation in the case where the volume force is zero:

$$\rho \frac{Du}{Dt} = -\nabla p + \eta \nabla^2 u + \frac{\eta}{3} \nabla(\nabla \cdot u) \quad (2)$$

Here, $\rho$ is a flow field density; u is a flow field flow velocity (vector quantity); Du/Dt is a material derivative; p is a pressure (pressure fluctuation, surface pressure fluctuation) on the surface of the rigid body 36; and $\eta$ is a flow field viscosity coefficient.

When the material derivative in the above Expression (2) is rewritten by using partial differentiation and then transformed by using the following relational expression:

$$\nabla \wedge \nabla \wedge A = \nabla(\nabla \cdot A) - \nabla^2 A$$

, the following Expression (3) is obtained. The symbol A in the above relational expression denotes an arbitrary vector.

$$\frac{\partial u}{\partial t} + (u \cdot \nabla)u = -\nabla \int \frac{dp}{\rho} - \nu\left(\nabla \wedge \nabla \wedge u - \frac{4}{3}\nabla(\nabla \cdot u)\right) \quad (3)$$

Here, $\nu$ is a kinematic viscosity coefficient of the flow field, and $\nu = \eta/\rho$.

Next, when the above Expression (3) is transformed by using the following relational expressions:

$$(u \cdot \nabla)u = \omega \wedge u + \nabla\left(\frac{1}{2}u^2\right)$$
$$\omega = \nabla \wedge u$$
$$B = \int \frac{dp}{\rho} + \frac{1}{2}u^2$$

the following Expression (4) is obtained. Here, $\omega$ is a flow field vorticity (vector quantity) and B is an enthalpy.

$$\frac{\partial u}{\partial t} + \omega \wedge u + \nabla B = -\nu\left(\nabla \wedge \omega - \frac{4}{3}\nabla(\nabla \cdot u)\right) \quad (4)$$

The flow field in this embodiment is an incompressible fluid or a slightly compressible fluid. In this case, the following relational expression:

$$\nabla \cdot u \ll \nabla \wedge \omega$$

holds true, so that the above Expression (4) can be approximated by the following Expression (5):

$$\frac{\partial u}{\partial t} + \omega \wedge u + \nabla B = -\nu(\nabla \wedge \omega) \quad (5)$$

When both sides of the above Expression (5) are multiplied by the flow field density $\rho$ to take the divergence, the following Expression (6) is obtained:

$$\nabla \cdot \left(\rho \frac{\partial u}{\partial t}\right) + \nabla \cdot (\rho \nabla B) = -\nabla \cdot (\rho \omega \wedge u) \quad (\because \nabla \cdot (\rho \nu \times \nabla \wedge \omega) = 0) \quad (6)$$

The sign "×" in the above Expression (6) is a multiplication sign. In this specification, multiplication signs are basically omitted, except when indicating a multiplication sign facilitates understanding.

Here, the relational expression shown in the following Expression (7) holds true between the flow field flow velocity u and the flow field density $\rho$:

$$\nabla \cdot u = -\frac{1}{\rho}\frac{D\rho}{Dt} \quad (7)$$

When the divergence of the product of "the flow field density $\rho$" and "a partial differential of the flow field flow velocity u with respect to time" (i.e., the left side of the following Expression (8)) is transformed by using the above Expression (7), an expression as on the right side of the following Expression (8) is obtained:

$$\frac{\partial p}{\partial \rho} = c^2$$

Here, c is a flow field sound velocity. The following relation holds true among the surface pressure fluctuation p, the flow field density $\rho$, and the flow field sound velocity c:

$$\frac{\partial p}{\partial \rho} = c^2$$

The flow field in this embodiment is a high-Reynolds-number flow (i.e., a flow having a relatively high flow velocity, e.g., 100 km/h to 140 km/h). The following relational expression holds true in a high-Reynolds-number flow:

$$\frac{\nu}{c^2} u \cdot (\nabla \wedge \omega) \ll \frac{1}{c^2}\frac{DB}{Dt}$$

The Reynolds number Re is defined as Re=uL/$\nu$, where L denotes a characteristic length of the flow field. When the term in the parentheses on the right side of the above Expression (8) is transformed as shown below and the above relational expression is applied, the term in the parentheses on the right side of Expression (8) is approximated by the following Expression (9):

$$\frac{1}{\rho c^2}\frac{\partial p}{\partial c} = \frac{1}{c^2}\frac{\partial B}{\partial t} - \frac{1}{c^2}u \cdot \left(\frac{\partial u}{\partial t}\right) \quad \text{(Expression (5))}$$
$$= \frac{1}{c^2}\frac{\partial B}{\partial t} - \frac{1}{c^2}u \cdot (-\omega \wedge u - \nabla B - \nu(\nabla \wedge \omega))$$
$$= \frac{1}{c^2}\frac{DB}{Dt} + \frac{\nu}{c^2}u \cdot (\nabla \wedge \omega) \quad \left(\nu\frac{1}{c^2}u \cdot (-\omega \wedge u) = 0\right)$$
$$\sim \frac{1}{c^2}\frac{DB}{Dt} \quad (9)$$

When the above Expression (6) is transformed (approximated) by using the above Expression (8) and Expression (9), the following Expression (10) is obtained:

$$\frac{D}{Dt}\left(\frac{1}{c^2}\frac{DB}{Dt}\right) - \frac{1}{\rho}\nabla \cdot (\rho\nabla)B = \frac{1}{\rho}\nabla \cdot (\rho\omega \wedge u) \quad (10)$$

Here, the flow field in this embodiment is a low-Mach-number flow (i.e., a flow field having a relatively low ratio of the flow velocity of the fluid to the sound velocity). The following relational expressions hold true in a low-Mach-number flow:

$$c \sim c_0$$
$$\rho \sim \rho_0$$
$$\frac{1}{c}\frac{D}{Dt} = \frac{1}{c}\frac{\partial}{\partial t} + \frac{u}{c}\cdot\nabla \sim \frac{1}{c}\frac{\partial}{\partial t} \quad (\because u \ll c)$$

Therefore, when the above Expression (10) is transformed by using these relational expressions, the Powell's formula shown in the following Expression (11) is obtained. In the above relational expression, $c_0$ is a flow field sound velocity in a static state and $\rho_0$ is a flow field density in a static state.

$$\left(\frac{1}{c_0^2}\frac{\partial^2}{\partial t^2} - \nabla^2\right)B = \nabla \cdot (\omega \wedge u) \quad (11)$$

Derivation of Expression of Relation Between Surface Pressure Fluctuation and Flow Field in Time Domain A Green's function G satisfies the relational expression of the following Expression (12):

$$\left(\frac{1}{c_0^2}\frac{\partial^2}{\partial t^2} - \nabla^2\right)G(x, z, t - \tau) = \delta(x - z)\delta(t - \tau)(19) \quad (12)$$

Here, the observation point x and the evaluation point z are as described above (see FIG. 6), and τ is past time. The function δ (x) is the Dirac delta function. The Green's function G in the above Expression (12) is expressed in a free space as in the following Expression (13):

$$G(x, z, t - \tau) = \frac{\delta\left(t - \tau - \frac{|x - z|}{c}\right)}{4\pi|x - z|} \quad (13)$$

When physical body boundary conditions are taken into account, the Powell's formula shown in the above Expression (11) is expressed as in the following Expression (14):

$$H\left(\frac{1}{c^2}\frac{\partial^2}{\partial t^2} - \nabla^2\right)B = H\nabla \cdot (\omega \wedge u) \quad (14)$$

Here, H (z) is the Heaviside unit function and defined by the following Expression (15):

$$H(z) = \begin{cases} 1 & (z \text{ in } V) \\ 0 & (z \text{ inside } S+) \end{cases} \quad (15)$$

Here, as shown in FIG. 6, V is a mass representing the flow domain 38, and S+ is an imaginary surface surrounding the surface S of the rigid body 36. In the above Expression (15), "z in V" shows the case where the evaluation point z is located inside the flow domain 38, and "z inside S+" shows the case where the evaluation point z is located inside the imaginary surface S+.

This Heaviside unit function H (z) satisfies the integral equation of the following Expression (16):

$$\int_V (\cdot)\nabla H d^3 z = \int_{S+}(\cdot)n dS \quad (16)$$

Here, (·) in the above expression denotes an inner product with an arbitrary value. As shown in FIG. 6, the rigid body 36 has an evaluation point y at a position in the surface S different from the position of the observation point x. In the above expression, n is a normal vector n (y) at the evaluation point y, and dS is a surface area dS (y) in the vicinity of the evaluation point y.

The first term and the second term on the left side, and the right side, of the above Expression (14) can be transformed as in the following Expressions (14-1), (14-2), and (14-3), respectively:

$$H\frac{1}{c^2}\frac{\partial^2}{\partial t^2}B = \frac{1}{c^2}\frac{\partial^2}{\partial t^2}HB \quad (14\text{-}1)$$

$$H\nabla^2 B = \nabla^2 HB - \nabla \cdot (B\nabla H) - \nabla H \cdot \nabla B \quad (14\text{-}2)$$

$$H\nabla \cdot (\omega \wedge u) = \nabla \cdot (H\omega \wedge u) - \nabla H \cdot (\omega \wedge u) \quad (14\text{-}3)$$

When the above Expressions (14-1) to (14-3) are substituted into the above Expression (14), the following Expression (17) is obtained:

$$\left(\frac{1}{c^2}\frac{\partial^2}{\partial t^2} - \nabla^2\right)HB = -\nabla \cdot (B\nabla H) - \nabla H \cdot (\nabla B + \omega \wedge u) + \nabla \cdot (H\omega \wedge u) \quad (17)$$

The second term (the minus sign is omitted) on the right side of the above Expression (17) can be transformed as in the following Expression (17-1):

$$\nabla H \cdot (\nabla B + \omega \wedge u) = \quad (17\text{-}1)$$
$$-\nabla H \cdot \left(\frac{\partial u}{\partial t} + v(\nabla \wedge \omega)\right) = -\nabla H \cdot \frac{\partial u}{\partial t} - v\nabla \cdot (\nabla H \wedge \omega)$$

When the above Expression (17-1) is substituted into the above Expression (17), the following Expression (18) is obtained:

$$\left(\frac{1}{c^2}\frac{\partial^2}{\partial t^2} - \nabla^2\right)HB = \quad (18)$$
$$-\nabla \cdot (B\nabla H) + \nabla H \cdot \left(\frac{\partial u}{\partial t}\right) + v\nabla \cdot (\nabla H \wedge \omega) + \nabla \cdot (H\omega \wedge u)$$

When the above Expression (13) is applied, the integral expression of the above Expression (18) becomes as in the following Expression (19):

$$HB(x, t) = \int_{-\infty}^{\infty} \int_V G(x, z, t - \tau) \qquad (19)$$

$$\left\{ -\nabla \cdot (B\nabla H) + \nabla H \cdot \left( \frac{\partial u}{\partial t} \right) + v\nabla \cdot (\nabla H \wedge \omega) + \right\} d^3 z d\tau$$
$$\nabla \cdot (H\omega \wedge u)$$

When the first term on the right side of the above Expression (19) is expanded by using the above Expression (18), the following Expression (19-1) is obtained. Hereinafter, for the convenience of notation, the time integral will be omitted when transformation of the terms on the right side of the above Expression (19) is described.

$$\int_V G(x,z,t-\tau)(-\nabla \cdot (B\nabla H))d^3z = \int_V \{-\nabla \cdot (GB\nabla H) + B\nabla G \cdot \nabla H\} d^3z = \oint_{S+} -GB\nabla H \cdot ndS + \int_V \{B\nabla G \cdot \nabla H\} d^3z = \oint_{S+} B\nabla G \cdot ndS \qquad (19\text{-}1)$$

When the second term and the third term on the right side of the above Expression (19) are expanded by using the above Expression (18), the following Expression (19-2) is obtained:

$$\int_V G(x, z, t - \tau) \left( \frac{\partial u}{\partial t} \cdot \nabla H + v\nabla \cdot (\nabla H \wedge \omega) \right) d^3 z = \qquad (19\text{-}2)$$

$$\oint_{S+} G(x, z, t - \tau) \frac{\partial u}{\partial t} \cdot ndS - \int_V v\nabla G \cdot (\nabla H \wedge \omega) d^3 z =$$

$$\oint_{S+} G(x, z, t - \tau) \frac{\partial u}{\partial t} \cdot ndS - \int_V v\nabla H \cdot (\nabla G \wedge \omega) d^3 z =$$

$$\oint_{S+} G(x, z, t - \tau) \frac{\partial u}{\partial t} \cdot ndS + \oint_{S+} v(\omega \wedge \nabla G) \cdot ndS$$

The fourth term on the right side of the above Expression (19) can be transformed as in the following Expression (19-3):

$$\int_V G(x,z,t-\tau)\nabla \cdot (H\omega \wedge u)d^3z = \int_V \{\nabla \cdot (HG\omega \wedge u) - \nabla G \cdot (H\omega \wedge u)\}d^3z = \oint_{S+} G(H\omega \wedge u) \cdot ndS + \int_V \nabla G \cdot (H\omega \wedge u)d^3z = -\int_V \nabla G \cdot (H\omega \wedge u)d^3z \qquad (19\text{-}3)$$

When the above Expressions (19-1) to (19-3) are substituted into the above Expression (19), the following Expression (20) is obtained:

$$HB(x, t) = \int_{-\infty}^{\infty} \oint_{S+} B\nabla G \cdot ndSd\tau + \int_{-\infty}^{\infty} \oint_{S+} G(x, y, t - \tau) \frac{\partial u}{\partial t} \cdot ndSd\tau + \qquad (20)$$

$$\int_{-\infty}^{\infty} \oint_{S+} v(\omega \wedge \nabla G) \cdot ndSd\tau - \int_{-\infty}^{\infty} \int_V \nabla G \cdot (H\omega \wedge u)d^3zd\tau$$

When the imaginary surface S+ is converged to the surface S of the rigid body 36, the above Expression (20) can be rewritten as in the following Expression (21):

$$HB(x, t) = \int_{-\infty}^{\infty} \oint_{S+} B\nabla G \cdot ndSd\tau + \int_{-\infty}^{\infty} \oint_{S+} G(x, y, t - \tau) \frac{\partial u}{\partial t} \cdot ndSd\tau + \qquad (21)$$

$$\int_{-\infty}^{\infty} \oint_{S+} v(\omega \wedge \nabla G) \cdot ndSd\tau - \int_{-\infty}^{\infty} \int_V \nabla G \cdot (H\omega \wedge u)d^3zd\tau$$

Here, in a high-Reynolds-number flow, the third term on the right side of the above Expression (21) is negligibly small compared with the fourth term. In addition, the second term on the right side is equivalent to zero, since the flow velocity is zero when the rigid body 36 is stationary. Therefore, the above Expression (21) can be simplified as in the following Expression (22):

$$HB(x,t) = \int_{-\infty}^{\infty} \oint_S B\nabla G \cdot ndSd\tau - \int_{-\infty}^{\infty} \int_V \nabla G \cdot (\omega \wedge u) d^3 z d\tau (\because \vec{\pi} (15)) \qquad (22)$$

Since the flow velocity is zero on a surface of a stationary object, the enthalpy B is expressed as in the following expression:

$$B = \int \frac{dp}{\rho} + \frac{1}{2} u^2 = \frac{p}{\rho}$$

When the right side p/ρ of the above expression is defined as p/ρ=p* and the enthalpy B is substituted into the above Expression (22), the relational equation of the following Expression (23) is obtained. This relational expression is "the expression of the relation between the surface pressure fluctuation and the flow field in the time domain."

$$p_*(x,t) = \int_{-\infty}^{\infty} \oint_S p_*(y,\tau) \nabla G(x,y,t-\tau) \cdot n(y) dS d\tau - \int_{-\infty}^{\infty} \int_V (\omega \wedge u)(z,\tau) \cdot \nabla G(x,z,t-\tau) d^3 z d\tau \qquad (23)$$

Derivation of PSD Calculation Formula

Since the relational expression of the above Expression (23) includes the value (function) p* (=p/ρ) based on the surface pressure fluctuation p on both sides thereof, this expression does not allow the surface pressure fluctuation p at the observation point x to be directly calculated from the flow velocity u and the vorticity ω. In the following, therefore, an expression of a relation between "the surface pressure fluctuation p at the observation point x" and "the flow field flow velocity u and vorticity ω" will be derived by transforming the above expression so as to eliminate the term including p* from the right side.

Figure 7:
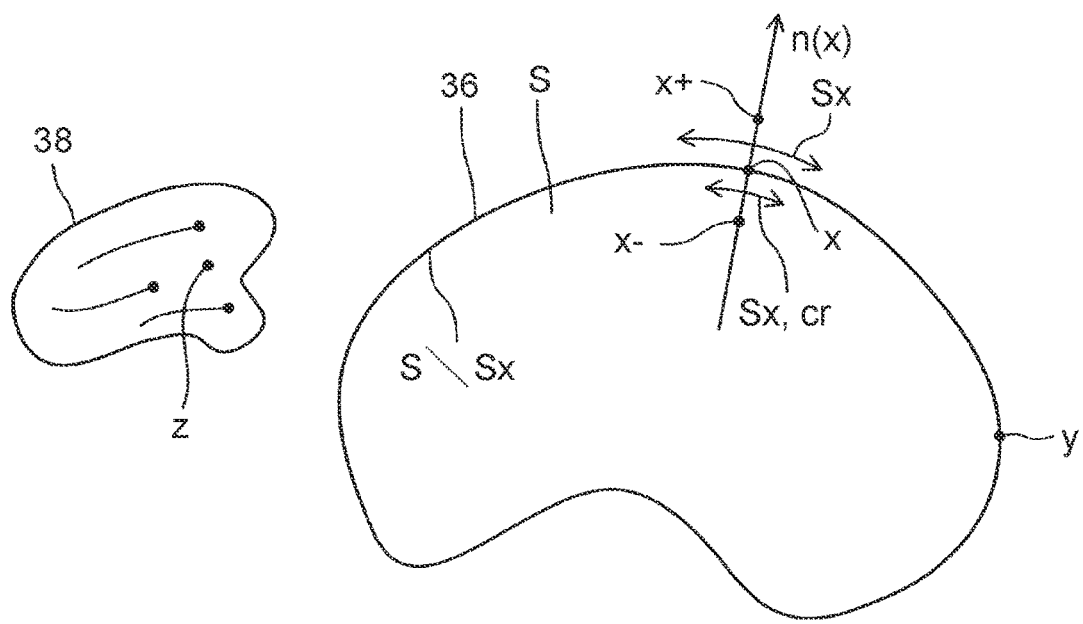
FIG. 7 is a schematic view of the rigid body model and the flow domain.

As shown in FIG. 7, a region in the vicinity of the observation point x on the surface S of the rigid body 36 is defined as a surface region Sx, and a normal vector of the surface region Sx is defined as n (x). The surface region Sx is a sufficiently large plane. Further, two points x+ and x− equidistant from the observation point x are defined on the normal vector n (x). The point x+ is located outside the rigid body 36, and the point x− is located inside the rigid body 36. The other symbols will be described later. When the points x+ and x− are substituted as observation points into the above Expression (22), the following Expressions (22-1) and (22-2), respectively, are obtained:

$$HB(x+,t) = \int_{-\infty}^{\infty} \oint_S B(y,\tau) \nabla G(x+,y,t-\tau) \cdot n(y) dSc\tau - \int_{-\infty}^{\infty} \int_V (\omega \wedge u)(z,\tau) \cdot \nabla G(x+,z,t-\tau) d^3 z d\tau \qquad (22\text{-}1)$$

$$HB(x-,t) = \int_{-\infty}^{\infty} \oint_S B(y,\tau) \nabla G(x-,y,t-\tau) \cdot n(y) dSd\tau - \int_{-\infty}^{\infty} \int_V (\omega \wedge u)(z,\tau) \cdot \nabla G(x-,z,t-\tau) d^3 z d\tau \qquad (22\text{-}2)$$

When both sides of Expression (22-1) and both sides of Expression (22-2) are respectively added up to take the limit for x and x+ as x− is approached, the following Expression (24) is obtained. In the following transformation of the expression, H (x+)=1 and H (x−)=0 are used (see Expression (15)).

$$p_*(x, t) = \lim_{(x+,x-) \to x} HB(x+, t) = \lim_{(x+,x-) \to x} (HB(x+, t) + HB(x-, t)) = \qquad (24)$$

$$\lim_{(x+,x-) \to x} \int_{-\infty}^{\infty} \oint_S B(y, \tau)(\nabla G(x+, y, t - \tau) + \nabla G(x-, y, t - \tau)) \cdot$$

-continued $$n(y)dSd\tau - \lim_{(x+,x-) \to x} \int_{-\infty}^{\infty} \int_{V} (\omega \wedge u)$$
$$(z, \tau) \cdot (\nabla G(x+, z, t-\tau) + \nabla G(x-, z, t-\tau))d^3zd\tau$$

The first term and the second term on the right side of the above Expression (24) can be transformed as in the following Expressions (24-1) and (24-2), respectively. In the following expression, S\Sx is a part of the surface S of the rigid body 36 that does not include the surface region Sx (see FIG. 7).

$$\lim_{(x+,x-) \to x} \int_{-\infty}^{\infty} \oint_{S} B(y, \tau) \quad (24\text{-}1)$$
$$(\nabla G(x+, y, t-\tau) + \nabla G(x-, y, t-\tau)) \cdot n(y)dSd\tau =$$
$$\lim_{(x+,x-) \to x} \int_{-\infty}^{\infty} \oint_{Sx} B(x, \tau)(\nabla G(x+, x, t-\tau) + \nabla G(x-, x, t-\tau)) \cdot$$
$$n(x)dSd\tau + \lim_{(x+,x-) \to x} \int_{-\infty}^{\infty} \oint_{S\backslash Sx} B(y, \tau)$$
$$(\nabla G(x+, y, t-\tau) + \nabla G(x-, y, t-\tau)) \cdot n(y)dSd\tau =$$
$$\int_{-\infty}^{\infty} \oint_{S\backslash Sx} 2p_*(y, \tau)\nabla G(x, y, t-\tau) \cdot n(y)dSd\tau$$

$$\lim_{(x+,x-) \to x} \int_{-\infty}^{\infty} \int_{V} (\omega \wedge u) \quad (24\text{-}2)$$
$$(z, \tau) \cdot (\nabla G(x+, z, t-\tau) + \nabla G(x-, z, t-\tau))d^3zd\tau =$$
$$\int_{-\infty}^{\infty} \int_{V} 2(\omega \wedge u)(z, \tau) \cdot \nabla G(x, z, t-\tau)d^3zd\tau$$

When the above Expressions (24-1) and (24-2) are substituted into the above Expression (24), the following Expression (25) is obtained:

$$p_*(x,t) = \int_{-\infty}^{\infty} \oint_{S\backslash Sx} 2p_*(y,\tau)\nabla G(x,y,t-\tau) \cdot n(y)dSd\tau - \int_{-\infty}^{\infty} \int_{V} 2(\omega \wedge u)(z,\tau) \cdot \nabla G(x,z,t-\tau)d^3zd\tau \quad (25)$$

Fourier transform is defined by the following Expression:

$$A_\theta(x) = \int_{-\infty}^{\infty} A(x,t)e^{-i\theta t}dt$$

Here, $A_\theta$ (x) in the above expression is the magnitude (amplitude) of the function A (x, t) at an angular frequency $\theta$. $A_\theta$ (x) is a complex number, and a complex conjugate $A_\theta^*$ (x) thereof satisfies the relational expression of the following Expression (26):

$$A_\theta^*(x) = A_{-\theta}(x) = \int_{-\infty}^{\infty} A(x,t)e^{i\theta t}dt \quad (26)$$

When Fourier transform is applied to the above Expression (24) and the result of Fourier transform of a convolution integral is used, the following Expression (27) is obtained:

$$p_{*\theta}(x) = \oint_{S\backslash Sx} 2p_{*\theta}(y)\nabla G_\theta(x,y) \cdot n(y)dS - \int_{V} 2(\omega \wedge u)_\theta(z) \cdot \nabla G_\theta(x,z)d^3z \quad (27)$$

Here, $G_\theta$ (x, z) resulting from Fourier transform of the Green's function G is expressed as in the following Expression (28) and satisfies the relational expression of the following Expression (29) (so-called Helmholtz equation):

$$G_\theta(x, z) = \frac{-e^{-i\theta\frac{|x-z|}{c_0}}}{4\pi|x-z|} = \frac{-e^{ik_0 r}}{4\pi r} \quad (28)$$

$$(\Delta + k_0^2)G_\theta(x, z) = \delta(x-z) \quad (29)$$

Here, $k_0$ is a wavenumber (so-called acoustic wavenumber) of the component of the angular frequency $\theta$, and $k_0 = \theta/c_0$.

The symbol r denotes the distance between the observation point x and the evaluation point z.

The gradient of $G_\theta$ (x, z) can be expressed as in the following Expression (30) by using the above Expression (28). Under a compact acoustic condition ($k_0 r \ll 1$), the gradient of $G_\theta$ (x, z) is not dependent on the angular frequency $\theta$, and only the function of the distance r can be approximated. The vector r in the following expression is a vector oriented from the observation point x toward the evaluation point Z.

$$\nabla G_\theta(x, z) = \nabla \frac{-e^{-ik_0 r}}{4\pi r} = \frac{(ik_0 r + 1)e^{-ik_0 r}}{4\pi r^2} \times \nabla r = \frac{(ik_0 r + 1)e^{-ik_0 r}}{4\pi r^2} \times \frac{\vec{r}}{r} \quad (30)$$

The autocorrelation function (see the above Expression (1)) of "the function $P_{*\theta}$ (x) based on the surface pressure fluctuation $p_\theta$ (x) at the observation point x" that is the left side of the above Expression (27) is expressed as in the following Expression (31):

$$\int_{\theta_l}^{\theta_h} p_{*\theta}(x)p_{*\theta}^*(x)d\theta = \int_{\theta_l}^{\theta_h} \oint_{S\backslash Sx} 2p_{*\theta}(y)p_{*\theta}^*(x)\nabla G_\theta(x,y) \cdot n(y)dSd\theta - \int_{\theta_l}^{\theta_h} \int_{V} 2p_{*\theta}^*(x)(\omega \wedge u)_\theta(z) \cdot \nabla G_\theta(x,z)d^3zd\theta \quad (31)$$

The above Expression (31) is expressed as in the following Expression (32) by using the compact acoustic condition of the gradient of $G_\theta$ (x, z) (see Expression (30)):

$$\int_{\theta_l}^{\theta_h} p_{*\theta}(x)p_{*\theta}^*(x)d\theta = \oint_{S\backslash Sx}(\int_{\theta_l}^{\theta_h} 2p_{*\theta}(y)p_{*\theta}^*(x)d\theta) \nabla G_\theta(x,y) \cdot n(y)dS - \int_{\theta_l}^{\theta_h} \int_{V} 2p_{*\theta}^*(x)(\omega \wedge u)_\theta(z) \cdot \nabla G_\theta(x,z)d^3zd\theta \quad (32)$$

Here, a correlation distance $l_{x, cr}$, a correlation area $S_{x, cr}$ (see FIG. 7), and a correlation volume $V_{x, cr}$ that are physical quantities at an arbitrary observation point x in an angular frequency band of interest [$\theta_l$, $\theta_h$] are defined by the following Expressions (33-1), (33-2), and (33-3), respectively. The symbol $\theta_m$ in the following expression denotes the center angular frequency of the angular frequency band of interest ($\theta_m = 2\pi f_m$).

$$l_{x,cr} \sim \frac{\overline{U}(x)}{\theta_m} \quad (33\text{-}1)$$

$$S_{x,cr} \sim l_{x,cr}^2 \quad (33\text{-}2)$$

$$V_{x,cr} \sim l_{x,cr}^3 \quad (33\text{-}3)$$

Thus, the correlation area $S_{x, cr}$ is proportional to the square of the average flow velocity, and the correlation volume $V_{x, cr}$ is proportional to the cube of the average flow velocity.

Since the angular frequency band of interest in this embodiment is relatively wide, the correlation distance $l_{x, cr}$ is relatively small. Accordingly, the correlation area $S_{x, cr}$ and the correlation volume $V_{x, cr}$ are also relatively small. Therefore, as shown in FIG. 7, the correlation area $S_{x, cr}$ is included in the surface region Sx ($S_{x, cr} \subset Sx$). Here, the integrated term of the first term on the right side of the above Expression (32) includes the evaluation point y on the surface S of the rigid body 36, and is integrated with respect to the region (S\Sx) of the surface S not including the surface region Sx. Thus, the physical quantities at the observation point x are uncorrelated with the physical quantities at the evaluation point y, and consequently the first term on the right side of the above Expression (32) is equivalent to zero.

Hereinafter, the product of an arbitrary function $F_\theta$ and a complex conjugate function $F_\theta^*$ thereof will be referred to as "a norm of the function $F_\theta$," and is defined as in the following Expression (34):

$$\|F_\theta\| = F_\theta F_{\theta^*} \tag{34}$$

Thus, the autocorrelation function (see Expression (1)) is a value obtained by integrating the norm of an arbitrary function $F_\theta$ with respect to the angular frequency band of interest.

Therefore, the above Expression (32) can be expressed as in the following Expression (35):

$$\int_{\theta l}^{\theta h} \|p_{*\theta}(x)\| d\theta = \int_{\theta l}^{\theta h} p_{*\theta}(x) p_{*\theta}^*(x) d\theta = -\int_{\theta l}^{\theta h} p_{*\theta}^*(x) \int_V 2(\omega \wedge u)_\theta(z) \cdot \nabla G_\theta(x,z) d^3z d\theta \tag{35}$$

According to the above Expression (35), the surface pressure fluctuation $p_\theta(x)$ at the observation point x in the angular frequency band of interest is dependent on the outer product of the flow field vorticity $\omega$ and flow velocity u inside the flow domain 38. Focusing on this point, the inventor of the present application considered that the surface pressure fluctuation $p_\theta(x)$ at the observation point x could be reduced by reducing the value of the autocorrelation function of the spatial integral on the right side of the above Expression (35). This autocorrelation function can be transformed as shown in the following Expression (36):

$$\int_{\theta l}^{\theta h} \left\| \int_V 2(\omega \wedge u)_\theta(z) \cdot \nabla G_\theta(x,z) d^3z \right\| d\theta = \tag{36}$$

$$\int_{\theta l}^{\theta h} \int_V \int_V 4[(\omega \wedge u)_\theta(z_1) \cdot \nabla G_\theta(x,z_1)][(\omega \wedge u)_\theta(z_2) \cdot \nabla G_\theta(x,z_2)]^* d^3z_1 d^3z_2 d\theta) =$$

$$\int_V \int_V \int_{\theta l}^{\theta h} 4[(\omega \wedge u)_\theta(z_1) \cdot \nabla G_\theta(x,z_1)][(\omega \wedge u)_\theta(z_2) \cdot \nabla G_\theta(x,z_2)]^* d\theta d^3z_1 d^3z_2$$

Here, z1 and z2 in the above expression are arbitrary evaluation points inside the flow domain 38, and $z1 \neq z2$. When the evaluation point z1 is not included in a correlation volume $V_{z2, cr}$ at the evaluation point z2, the correlation between the physical quantities at the evaluation point z1 and the physical quantities at the evaluation point z2 in the angular frequency band of interest can be disregarded. Therefore, the above Expression (36) can be further transformed as in the following Expression (37):

$$\int_{\theta l}^{\theta h} \left\| \int_V 2(\omega \wedge u)_\theta(z) \cdot \nabla G_\theta(x,z) d^3z \right\| d\theta = \int_V \int_{\theta l}^{\theta h} \|2(\omega \wedge u)_\theta(z_2) \cdot \nabla G_\theta(x,z_2)\| d\theta \times V_{z_2,cr} d^3z_2 \tag{37}$$

On the right side of the above Expression (37), "the part integrated with respect to the angular frequency band of interest" can be transformed as in the following Expression (38) by using the above Expression (30):

$$\int_{\theta l}^{\theta h} \|2(\omega \wedge u)_\theta(z_2) \cdot \nabla G_\theta(x,z_2)\| d\theta = \tag{38}$$

$$\int_{\theta l}^{\theta h} \left\| 2(\omega \wedge u)_\theta(z_2) \cdot \frac{(ik_0 r + 1) e^{-ik_0 r}}{4\pi r^2} \times \frac{\vec{r}}{r} \right\| d\theta =$$

$$\int_{\theta l}^{\theta h} \left\| 2(\omega \wedge u)_\theta(z_2) \cdot \frac{1}{4\pi r^2} \times \frac{\vec{r}}{r} \right\| d\theta$$

As shown in the following Expressions (39-1) and (39-2), the flow velocity u in the above Expression (38) can be decomposed into the average flow velocity $\overline{U}$- as an average component and the turbulence flow velocity $\tilde{u}$~ as a turbulent component, and the vorticity $\omega$ can be decomposed into the average vorticity $\overline{\Omega}$- as an average component and the turbulent vorticity $\tilde{\omega}$~ as a turbulent component.

$$u = \overline{U} + \tilde{u} \tag{39-1}$$

$$\omega = \overline{\Omega} + \tilde{\omega} \tag{39-2}$$

The vector r in a spatial coordinate system of the rigid body model 36 is specified by the following Expression (40):

$$\vec{r} = (r1, r2, r3) \tag{40}$$

Here, r1, r2, and r3 are e1, e2, and e3 components of the vector r, with the observation point x being the origin.

When Expressions (39-1), (39-2), and (40) are substituted into the right side of the above Expression (38), the right side thereof can be transformed as in the following Expression (41). Since the product of the turbulent components is negligibly small, this product is omitted in the following Expression (41):

$$\int_{\theta l}^{\theta h} \left\| 2(\omega \wedge u)_\theta(z_2) \cdot \frac{1}{4\pi r^2} \times \frac{\vec{r}}{r} \right\| d\theta = \tag{41}$$

$$\frac{1}{16\pi^2 r^4} \int_{\theta l}^{\theta h} \left\| 2(\overline{\Omega} \wedge \tilde{u}_\theta)(z_2) \cdot \frac{\vec{r}}{r} + (\tilde{\omega}_\theta \wedge \overline{U})(z_2) \cdot \frac{\vec{r}}{r} \right\| d\theta =$$

$$\frac{1}{4\pi^2 r^6} \int_{\theta l}^{\theta h} \|(\overline{\Omega}_{e2} \times \tilde{u}_{e3\theta}) r1 - (\overline{\Omega}_{e3} \times \tilde{u}_{e2\theta}) r1 + (\overline{\Omega}_{e3} \times \tilde{u}_{e1\theta}) r2 -$$

$$(\overline{\Omega}_{e1} \times \tilde{u}_{e3\theta}) r2 + (\overline{\Omega}_{e1} \times \tilde{u}_{e2\theta}) r3 - (\overline{\Omega}_{e2} \times \tilde{u}_{e1\theta}) r3 +$$

$$(\overline{U}_{e3} \times \tilde{\omega}_{e2\theta}) r1 - (\overline{U}_{e2} \times \tilde{\omega}_{e3\theta}) r1 + (\overline{U}_{e1} \times \tilde{\omega}_{e3\theta}) r2 -$$

$$(\overline{U}_{e3} \times \tilde{\omega}_{e1\theta}) r2 + (\overline{U}_{e2} \times \tilde{\omega}_{e1\theta}) r3 - (\overline{U}_{e1} \times \tilde{\omega}_{e2\theta}) r3 \| d\theta$$

Here, the correlation function of two arbitrary functions $E_\theta$ and $F_\theta$ is defined in the angular frequency band of interest as in the following Expression (42):

$$\overline{E_\theta F_\theta} = \int_{\theta l}^{\theta h} E_\theta F_\theta^* d\theta \tag{42}$$

When the above Expressions (1) and (42) are applied, the relational expressions shown in the following Expressions (43-1) to (43-6) are obtained based on the hypothesis that vortices have uniform isotropy:

$$\overline{\tilde{u}_{i\theta} \tilde{\omega}_{j\theta}} + \overline{\tilde{\omega}_{j\theta} \tilde{u}_{i\theta}} = 0 \; \forall \; i, j \; i, j \in (e1, e2, e3) \tag{43-1}$$

$$\overline{\tilde{u}_{i\theta} \tilde{u}_{j\theta}} = 0 \; \forall \; i \neq j \; i, j \in (e1, e2, e3) \tag{43-2}$$

$$\overline{\tilde{\omega}_{i\theta} \tilde{\omega}_{j\theta}} = 0 \; \forall \; i \neq j \; i, j \in (e1, e2, e3) \tag{43-3}$$

$$\|\tilde{u}_{e1\theta}\| = \|\tilde{u}_{e2\theta}\| = \|\tilde{u}_{e3\theta}\| = \frac{\|\tilde{u}_\theta\|}{3} \tag{43-4}$$

$$\|\tilde{\omega}_{e1\theta}\| = \|\tilde{\omega}_{e2\theta}\| = \|\tilde{\omega}_{e3\theta}\| = \frac{\|\tilde{\omega}_\theta\|}{3} \tag{43-5}$$

$$\|\tilde{\omega}_\theta\| \sim \frac{\partial \tilde{u}_\theta}{\partial x} \frac{\partial \tilde{u}_\theta^*}{\partial x} \sim \frac{\partial \tilde{u}_\theta}{\overline{U} \partial t} \frac{\partial \tilde{u}_\theta^*}{\overline{U} \partial t} \sim \left( k \frac{\theta_m}{\overline{U}} \right)^2 \|\tilde{u}_\theta\| \tag{43-6}$$

Here, k is a constant specifying the relation between the flow velocity $u_\theta$ and the vorticity $\omega_\theta$.

When the right side of the above Expression (41) is arranged by using the above Expressions (43-1) to (43-6), the left side of the above Expression (38) is finally expressed as in the following Expression (44):

$$\int_{\theta l}^{\theta h} \|2(\omega \wedge u)_\theta(z_2) \cdot \nabla G_\theta(x, z_2)\| d\theta = \qquad (44)$$

$$\frac{1}{12\pi^2 r^6} \|\tilde{u}_\theta\| \left(k\frac{\theta_m}{U}\right)^2 \left\{ (\overline{U}_{e2} \times r1 - \overline{U}_{e1} \times r2)^2 + \right.$$
$$\left. (\overline{U}_{e1} \times r3 - \overline{U}_{e3} \times r1)^2 + (\overline{U}_{e3} \times r2 - \overline{U}_{e2} \times r3)^2 \right\} +$$
$$\frac{1}{12\pi^2 r^6} \|\tilde{u}_\theta\| \left\{ (\overline{\Omega}_{e2} \times r1 - \overline{\Omega}_{e1} \times r2)^2 + (\overline{\Omega}_{e1} \times r3 - \overline{\Omega}_{e3} \times r1)^2 + \right.$$
$$\left. (\overline{\Omega}_{e3} \times r2 - \overline{\Omega}_{e2} \times r3)^2 \right\} =$$
$$\frac{1}{12\pi^2 r^6} \|\tilde{u}_\theta\| \left(k\frac{\theta_m}{U}\right)^2 |\overline{U} \wedge \vec{r}|^2 + \frac{1}{12\pi^2 r^6} \|\tilde{u}_\theta\| |\overline{\Omega} \wedge \vec{r}|^2 |\vec{A}|^2 =$$
$$(A_x^2 + A_y^2 + A_z^2)$$

The right side of the above Expression (44) corresponds to "the part integrated with respect to the angular frequency band of interest" on the right side of the above Expression (37). Thus, when the right side of the above Expression (44) is substituted into this part of Expression (37), the following Expression (45) is obtained:

$$\int_{\theta l}^{\theta h} \int_V \|2(\omega \wedge u)_\theta(z_2) \cdot \nabla G_\theta(x, z_2)\| d^3 z_2 \, d\theta = \qquad (45)$$

$$\int_V \frac{\|\tilde{u}_\theta\|}{12\pi^2 r^6} \left\{ \left(k\frac{\theta_m}{U}\right)^2 \times |\overline{U} \wedge \vec{r}|^2 + |\overline{\Omega} \wedge \vec{r}|^2 \right\} V_{z_2,cr} d^3 z_2$$

When the integrated term on the right side of the above Expression (45) is multiplied by "the square $\rho^2$ of the flow field density" and the evaluation point z2 is rewritten into a general symbol z, the PSD calculation formula defined by the following Expression (46) is obtained. In this specification, Expression (46) thus derived is defined as an indicator of the degree of contribution of "the flow field at the evaluation point z inside the flow domain 38" to "the surface pressure fluctuation at the observation point x in the rigid body 36." The reason for multiplying by $\rho^2$ is because p*=p/$\rho$ is used in the process of deriving the PSD calculation formula.

$$PDS(x, z) = \frac{\rho^2 \|\tilde{u}_\theta\|}{12\pi^2 r^6} \left\{ \left(k\frac{\theta_m}{U}\right)^2 \times |\overline{U} \wedge \vec{r}|^2 + |\overline{\Omega} \wedge \vec{r}|^2 \right\} V_{z,cr} \qquad (46)$$

The approximation formula shown in the following Expression (47) holds true between the surface pressure fluctuation $p_\theta$ (x) and the PSD (x, z) at the observation point x (see Expressions (35), (45), and (46)).

$$\int_{\theta l}^{\theta h} \|p_\theta(x)\| d\theta = \qquad (47)$$

$$\int_{\theta l}^{\theta h} p_\theta(x) p_{\theta^*}(x) d\theta = \rho^2 \int_{\theta l}^{\theta h} p_{*\theta}(x) p_{*\theta^*}(x) d\theta = \rho^2 \int_{\theta l}^{\theta h} \|p_{*\theta}(x)\| d\theta \approx$$

$$\rho^2 \int_V \int_{\theta l}^{\theta h} \|2(\omega \wedge u)_\theta(z) \cdot \nabla G_\theta(x, z_2)\| d\theta \times V_{z,cr} d^3 z =$$

$$\int_V \frac{\rho^2 \|\tilde{u}_\theta\|}{12\pi^2 r^6} \left\{ \left(k\frac{\theta_m}{U}\right)^2 \times |\overline{U} \wedge \vec{r}|^2 + |\overline{\Omega} \wedge \vec{r}|^2 \right\} V_{z,cr} d^3 z =$$

$$\int_V PDS(x, z) d^3 z$$

Thus, the integrated value of "the norm of the surface pressure fluctuation $p_\theta$ (x) at the observation point x" in the angular frequency band of interest (in other words, the autocorrelation function of the surface pressure fluctuation $p_\theta$ (x) at the observation point x) can be approximated as "a value obtained by spatially integrating the PSD for the observation point x with respect to the flow domain." Therefore, the PSD functions with high accuracy as an indicator of the degree of contribution of the flow field at the evaluation point z to the surface pressure fluctuation $p_\theta$ (x) at the observation point x. This concludes the description about the derivation of the PSD calculation formula.

Wind Noise Analysis Method

Figure 8:
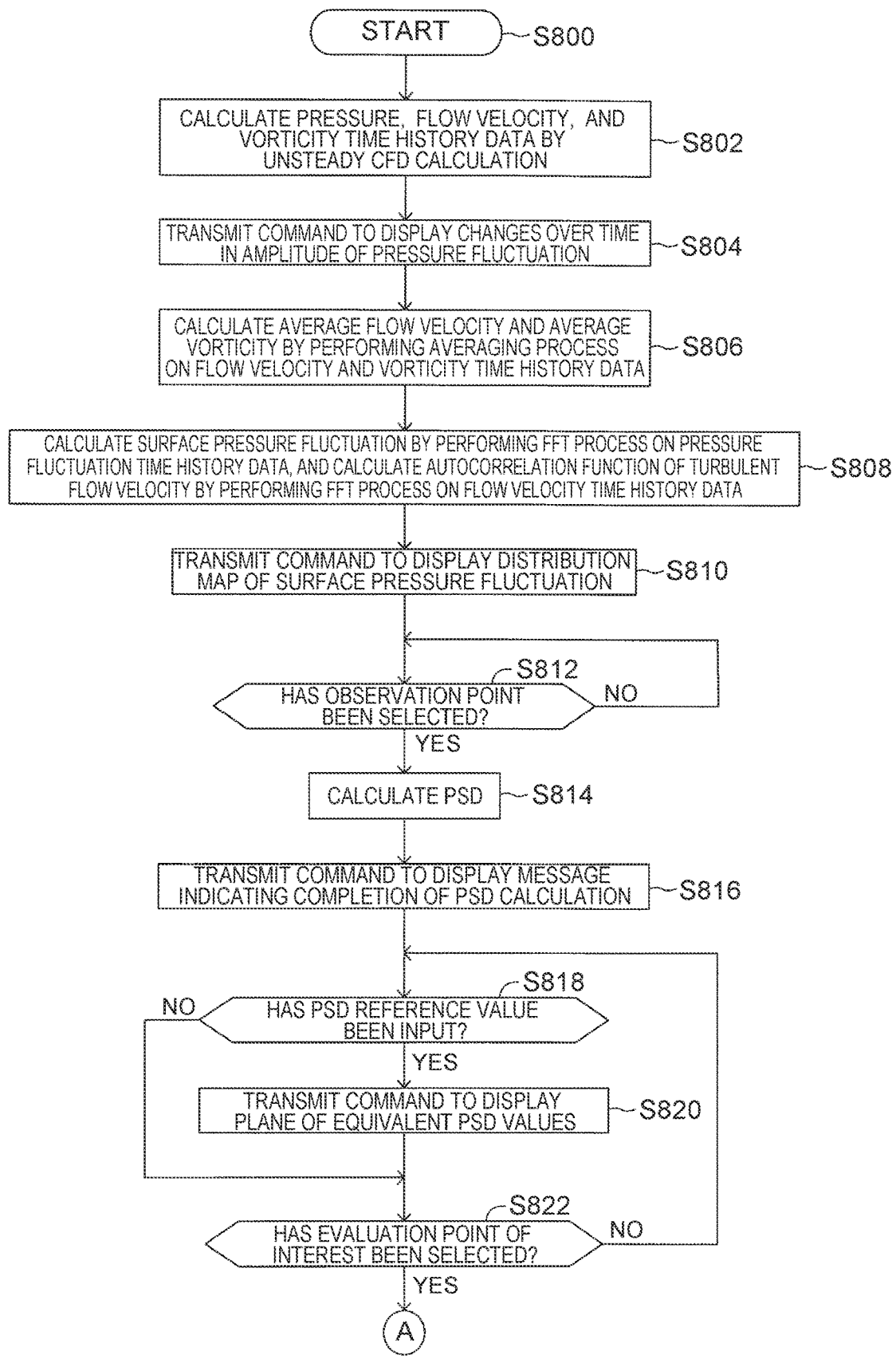
FIG. 8 is a flowchart showing the procedure of a wind noise analysis method (part 1)

Next, a method of analyzing wind noise in the running vehicle model 20 will be specifically described. The CPU of the computation unit 14 of the calculation device 10 is configured to execute the routine shown by the flowchart of FIG. 8. Starting the process from step 800 of FIG. 8, the CPU sequentially performs processes in step 802 to step 808 to be described below.

Step 802: The CPU starts an unsteady CFD simulation involving causing the vehicle model 20 to run, and calculates the pressure fluctuation time history data p (x, t), the flow velocity time history data u (z, t), and the vorticity time history data ω (z, t) within the analysis range (inside the analysis surface and the flow domain 21) for a predetermined time. The time history data p (x, t) is calculated for each node x, while the time history data u (z, t) and ω (z, t) are calculated for each node z. Step 804: Based on the pressure fluctuation time history data p (x, t) calculated in step 802, the CPU creates data showing changes over time in the amplitude of the pressure fluctuation on the analysis surface, and transmits, to the output unit 16, a command to display this data. Accordingly, the changes over time in the amplitude of the pressure fluctuation are displayed as an animation on the display screen 18 (see FIG. 2B).

Step 806: The CPU calculates the average flow velocity U-(z) and the average vorticity Ω-(z) for each node z by performing the averaging process on each of the flow velocity time history data u (z, t) and the vorticity time history data ω (z, t) calculated in step 802. Step 808: The CPU calculates the surface pressure fluctuation $p_\theta$ (x) in the angular frequency band of interest by performing the fast Fourier transform process on the pressure fluctuation time history data p (x, t) calculated in step 802. The surface pressure fluctuation $p_\theta$ (x) is calculated for each node x. Moreover, the CPU calculates the autocorrelation function of the turbulent flow velocity u~$_\theta$ (z) in the angular frequency band of interest by performing the fast Fourier transform process on the flow velocity time history data u (z, t) calculated in step 802. This autocorrelation function is calculated for each node z. The processes in step 802 to step 808 correspond to the unsteady CFD calculation processes.

Step 810: Based on the surface pressure fluctuation $p_\theta$ (x) calculated in step 808, the CPU creates "data showing a distribution map of the surface pressure fluctuation $p_\theta$ (x) at the center angular frequency $\theta_m$ of the angular frequency band of interest," and transmits, to the output unit 16, a command to display this data. Accordingly, the distribution map of the surface pressure fluctuation $p_\theta$ (x) is displayed as an image on the display screen 18 (see FIG. 3A). Thereafter, the CPU moves to step 812.

In step 812, the CPU determines whether the observation point x has been selected by the operator. The observation point x is selected by the operator based on the distribution map of the surface pressure fluctuation $p_\theta$ (x) (see step 810). When it is determined that the observation point x has been selected, the CPU determines "Yes" in step 812 and performs a process in step 814 to be described later. On the other hand, when it is determined that the observation point x has not been selected, the CPU determines "No" in step 812 and makes the determination in step 812 again. The CPU repeats this process each time a predetermined computation time elapses, until it is determined that the observation point x has been selected.

Step 814: Using the PSD calculation formula (see Expression (46)) stored in the RAM of the computation unit 14, the CPU calculates, for each node z, the PSD (x, z) for the observation point x selected in step 812. The average flow velocity U-(z) and the average vorticity Ω-(z) calculated in step 806, the autocorrelation function of the turbulent flow velocity u~$_\theta$ (z) calculated in step 808, etc. are substituted into this calculation formula. Thereafter, the CPU performs the following process in step 816.

Step 816: The CPU transmits, to the output unit 16, a command to display a message indicating that the PSD calculation has been completed. Accordingly, this message is displayed on the display screen 18, letting the operator know that the calculation process has been completed. Thereafter, the CPU moves to step 818.

In step 818, the CPU determines whether the reference value of the PSD has been input by the operator. When it is determined that the reference value has been input, the CPU determines "Yes" in step 818 and performs the following process in step 820.

Step 820: The CPU creates data showing a plane of equivalent PSD values having the reference value input in step 818, and transmits, to the output unit 16, a command to display this data. Accordingly, the plane of equivalent PSD values having the reference value input by the operator is displayed as an image on the display screen 18 (see FIG. 4A to FIG. 4C). Thereafter, the CPU moves to step 822.

Figure 9:
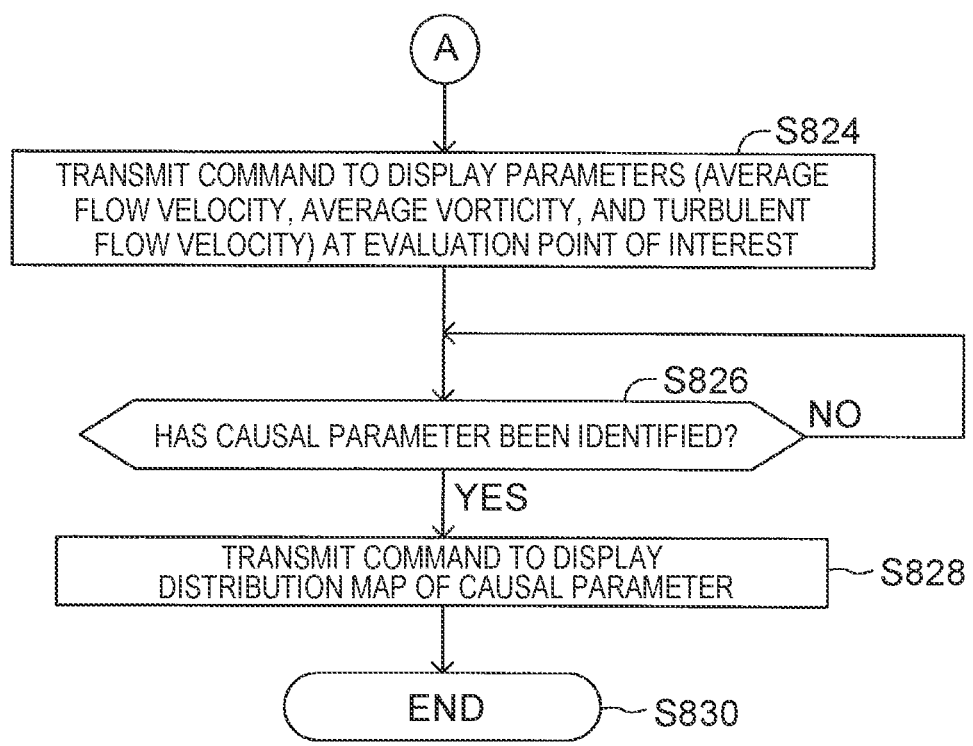
FIG. 9 is a flowchart showing the procedure of the wind noise analysis method (part 2)

In step 822, the CPU determines whether the evaluation point of interest z has been selected by the operator. The evaluation point of interest z is selected by the operator based on the plane of equivalent PSD values (see step 820). When it is determined that the evaluation point of interest z has been selected, the CPU determines "Yes" in step 822 and performs a process in step 824 (FIG. 9) to be described later.

On the other hand, when it is determined that the evaluation point of interest z has not been selected (specifically, when the operator cannot select the evaluation point of interest z from the current plane of equivalent PSD values, or when the operator is currently selecting the evaluation point of interest z), the CPU determines "No" in step 822 and makes the determination in step 818 again.

When it is determined in step 818 that the reference value has been input (i.e., the reference value of the PSD has been re-input by the operator), the CPU determines "Yes" in step 818 and performs the process in step 820, and determines in step 822 again whether the evaluation point of interest z has been selected. On the other hand, when it is determined that the reference value has not been input in step 818, the CPU determines "No" in step 818 and moves to step 822, and determines in step 822 again whether the evaluation point of interest z has been selected. The CPU repeats the processes in step 818 to step 822 until it is determined that the evaluation point of interest z has been selected.

On the other hand, when the CPU moves from step 816 directly to step 818 and determines that the reference value has not been input (i.e., an initial reference value has not been input), the CPU determines "No" in step 818 and moves to step 822. Since the evaluation point of interest z is selected based on the plane of equivalent PSD values (i.e., selected through step 820), when the initial reference value has not been input (i.e., when the CPU has not gone through step 820), the CPU determines "No" in step 822.

Step 824 (FIG. 9): The CPU transmits, to the output unit 16, a command to display numerical data on the parameters composing the PSD (x, z) at the evaluation point of interest z selected in step 822 among the PSDs calculated in step 814. These parameters are specifically the average flow velocity U-(z), the turbulent flow velocity u~$_\theta$ (z), and the average vorticity Ω-(z) at the evaluation point of interest z (see steps 806 and 808). Accordingly, the numerical data on the parameters composing the PSD (x, z) is displayed on the display screen 18. Thereafter, the CPU moves to step 826.

In step 826, the CPU determines whether the causal parameter has been identified. The causal parameter is identified by the operator based on the numerical data on the parameters composing the PSD (x, z) (see step 824). When it is determined that the causal parameter has been identified, the CPU determines "Yes" in step 826 and performs a process in step 828 to be described later. On the other hand, when it is determined that the causal parameter has not been identified, the CPU determines "No" in step 826 and makes the determination in step 826 again. The CPU repeats this process each time a predetermined computation time elapses, until it is determined that the causal parameter has been identified.

Step 828: The CPU creates data showing a distribution map of the causal parameter in a predetermined plane passing through the evaluation point of interest z selected in step 822 (typically, a plane parallel to the e1-e2 plane). The CPU transmits, to the output unit 16, a command to display this data. Accordingly, the distribution map of the causal parameter is displayed on the display screen 18 (see FIG. 5B). Thereafter, the CPU moves to step 830 and ends the current routine.

Figure 10A:
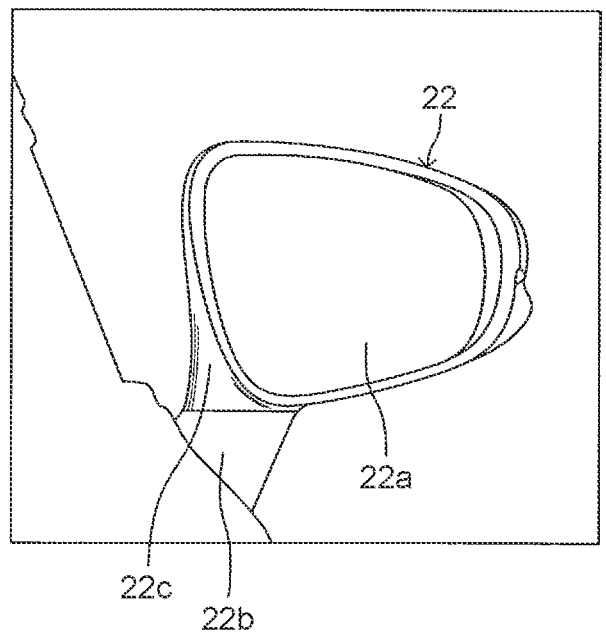
FIG. 10A is a view used to describe an improvement effect on a surface pressure fluctuation (wind noise) achieved by changing the shape of the vehicle model, and is a sketch of a right side mirror before the shape change.
Figure 10B:
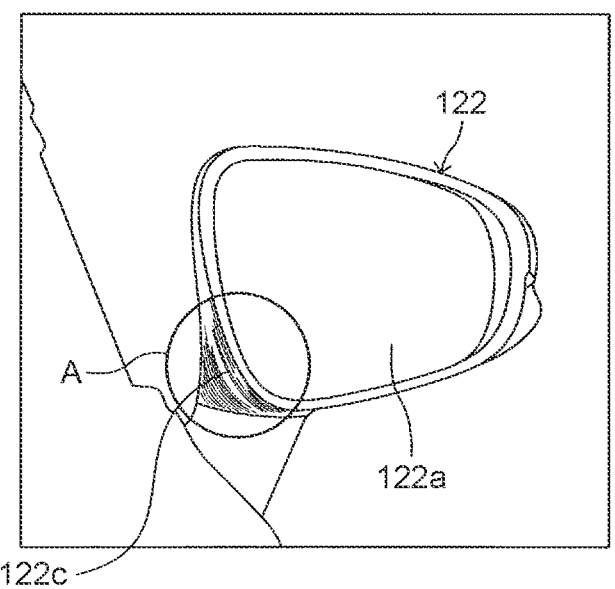
FIG. 10B is a sketch of the right side mirror after the shape change.

Improvement Effect on Surface Pressure Fluctuation (Wind Noise) Achieved by Device of Embodiment Next, the improvement effect on the surface pressure fluctuation $p_\theta$ (x) resulting from changing the shape in the analysis range of the vehicle model 20 by means of the device of the embodiment will be specifically described with reference to FIG. 10A to FIG. 11B. In the example of FIG. 5A and FIG. 5B, such a shape of the right side mirror 22 as can reduce the likelihood of separation of an airflow in the region 34 is studied. FIG. 10A shows a sketch of the right side mirror 22 of the vehicle model 20. As shown in FIG. 10A, the right side mirror 22 has a mirror part 22a in which a mirror is provided, a base part 22b fixed to the vehicle body, and a connection part 22c connecting the mirror part 22a and the base part 22b to each other. The region 34 is located in the vicinity of the connection part 22c. The connection part 22c is relatively thin, and a step is formed at the border between the connection part 22c and the mirror part 22a. The inventor of the present application considered that this step caused separation of an airflow in the region 34, and studied a shape that could reduce the step. FIG. 10B shows a right side mirror 122 of a vehicle model having the shape changed based on the study. As shown in FIG. 10B, a connection part 122c of the right side mirror 122 is thicker than the connection part 22c. As a result, the border between the connection part 122c and a mirror part 122a is smoothed and the step is reduced.

Figure 11A:
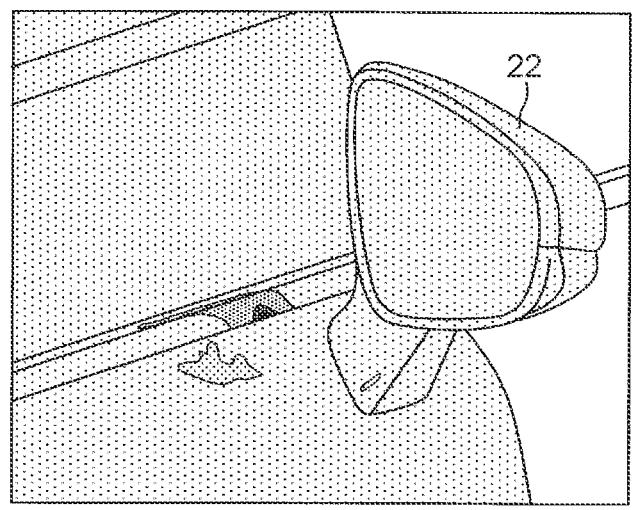
FIG. 11A is a distribution map of a surface pressure fluctuation around the right side mirror after the shape change.
Figure 11B:
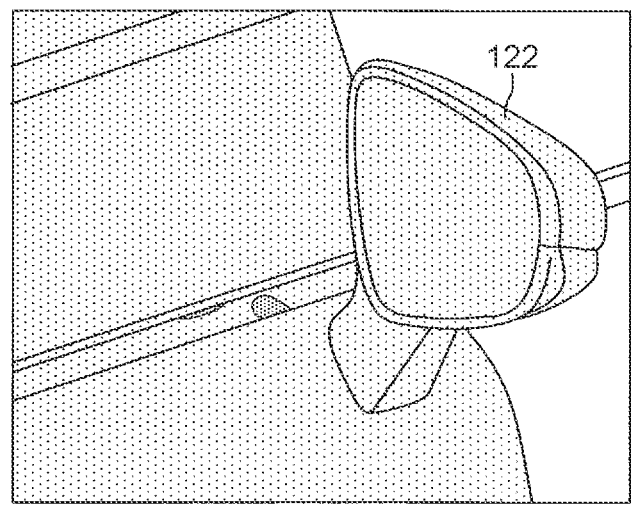
FIG. 11B is a distribution map of a surface pressure fluctuation around the right side mirror before the shape change.

To verify the improvement effect on the surface pressure fluctuation $p_\theta$ (x) resulting from the shape change, the inventor of the present application compared distribution maps of the surface pressure fluctuations $p_\theta$ (x) on analysis surfaces of the respective models. FIG. 11A shows a distribution map of the vehicle model 20, and FIG. 11B shows a distribution map of the vehicle model after the shape change. A comparison between FIG. 11A and FIG. 11B shows that changing the shape of the right side mirror 22 results in a significant reduction of the surface pressure fluctuation $p_\theta$ (x) in the vicinity of the right side mirror 122. Thus, it has been proven that the device of the embodiment can efficiently and reliably reduce the surface pressure fluctuation (i.e., wind noise) in the vehicle model by identifying the position of the flow field that contributes significantly to the surface pressure fluctuation in the vehicle model by means of the PSD.

Reliability and Versatility of PSD as Indicator

As described above, "the value obtained by spatially integrating the PSD for the node x with respect to the flow domain" is an approximate value of "the autocorrelation function of the surface pressure fluctuation $p_\theta$ (x) at the node x" (see Expression (47)). In the following, the reliability of the PSD as an indicator will be studied by verifying the accuracy of this approximation. Specifically, a surface pressure fluctuation calculated (estimated) based on "the value obtained by spatially integrating the PSD with respect to the flow domain" (hereinafter also referred to as an "estimated surface pressure fluctuation") is compared with a surface pressure fluctuation $p_\theta$ calculated by unsteady CFD calculation software, to thereby verify the accuracy of the approximation of the estimated surface pressure fluctuation. While Power FLOW is used as the software in this embodiment, the type of software is not limited to this example.

Moreover, in the following, the versatility of the PSD as an indicator will also be studied by verifying the accuracy of the approximation not only for a vehicle model but also for a fore-step model having a different shape from the vehicle model.

Figure 12A:
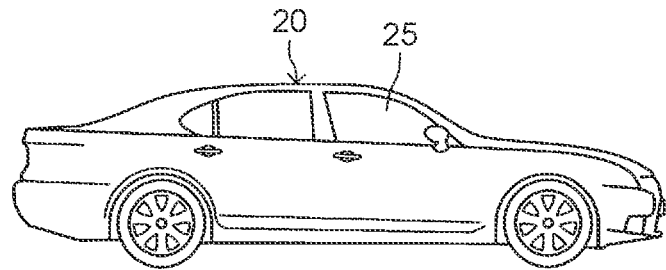
FIG. 12A is a view used to describe the reliability and versatility of the PSD as an indicator, and is a schematic view of a vehicle model.
Figure 12B:
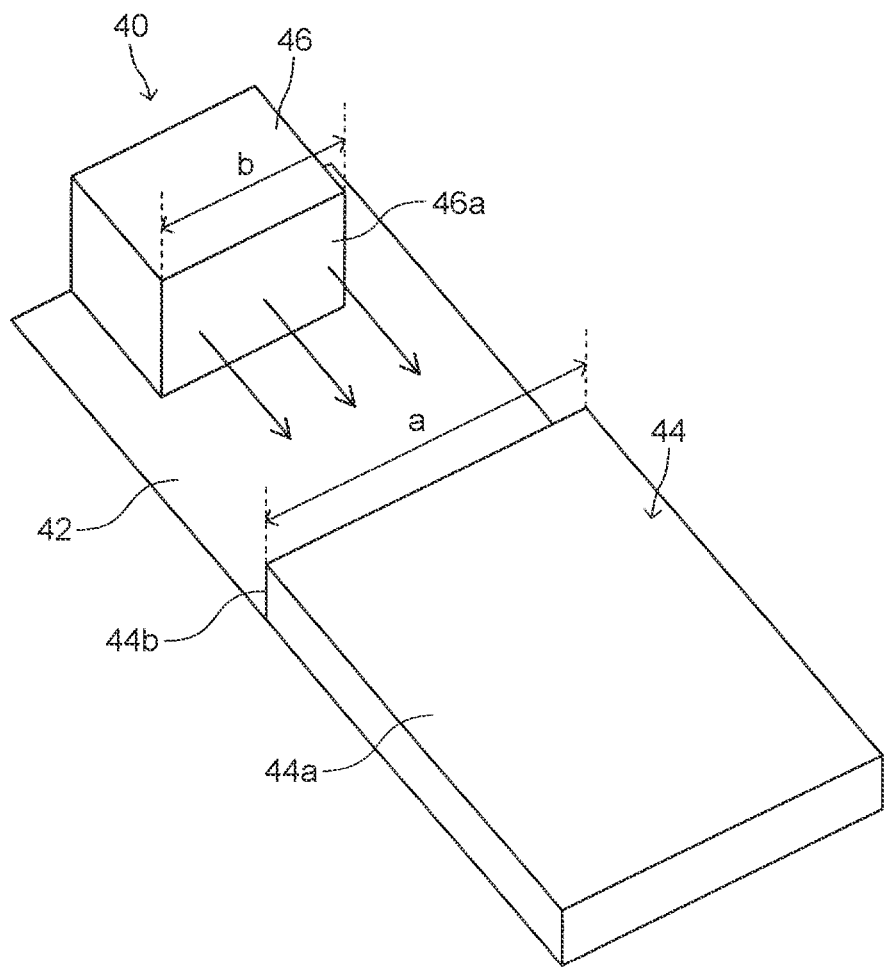
FIG. 12B is a schematic view of a fore-step model.

FIG. 12A is the vehicle model 20 used in the above description. FIG. 12B is a schematic view of a fore-step model 40. The fore-step model 40 has a reference surface 42, a rectangular prism-shaped step 44 disposed on the reference surface 42, and a nozzle 46 disposed on the reference surface 42 at a distance from the step 44. An upper surface 44a of the step 44 is parallel to the reference surface 42. A step is formed between a side surface 44b of the step 44 (a surface on the side of the nozzle 46) and the reference surface 42. The nozzle 46 has an air blow opening 46a parallel to and facing the side surface 44b of the step 44. Through the air blow opening 46a, air is sent toward the step 44. When a direction orthogonal to the air blow direction is specified as a "width direction," a length a of the step 44 in the width direction is larger than a length b of the nozzle 46 in the width direction. The height of the step 44 is smaller than the height of the nozzle 46. The center of the nozzle 46 in the width direction coincides in the width direction with the center of the step 44 in the width direction. In this verification, a right front door glass 25 of the vehicle model 20 and the upper surface 44a of the step 44 of the fore-step model 40 are analysis targets.

Figure 13A:
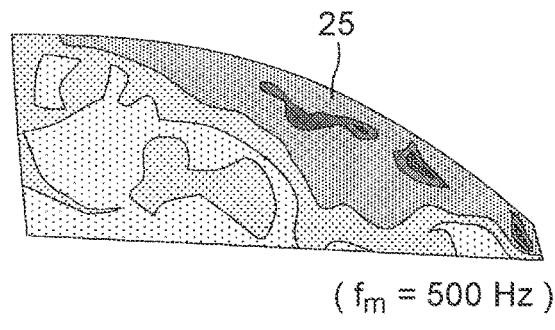
FIG. 13A is a distribution map of a surface pressure fluctuation estimated by means of the PSD (estimated surface pressure fluctuation) on a right front door glass of the vehicle model.
Figure 13B:
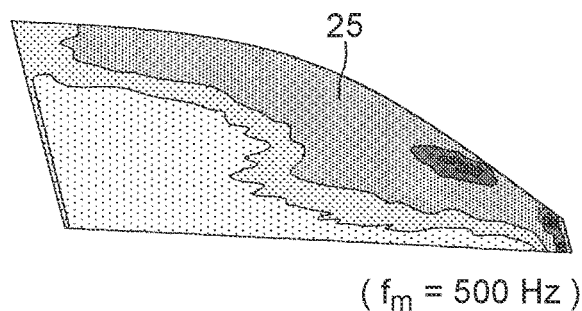
FIG. 13B is a distribution map of a surface pressure fluctuation on the right front door glass of the vehicle model calculated by an unsteady CFD software simulation.
Figure 14A:
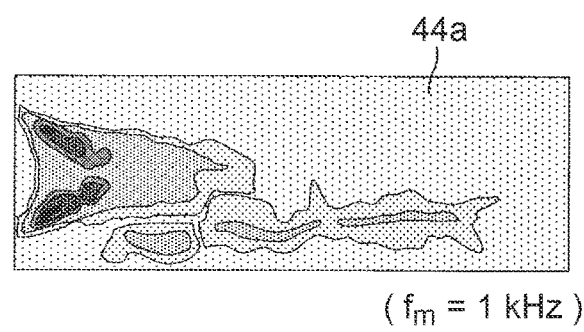
FIG. 14A is a distribution map of a surface pressure fluctuation estimated by means of the PSD (estimated surface pressure fluctuation) on an upper surface of a step of the fore-step model.
Figure 14B:
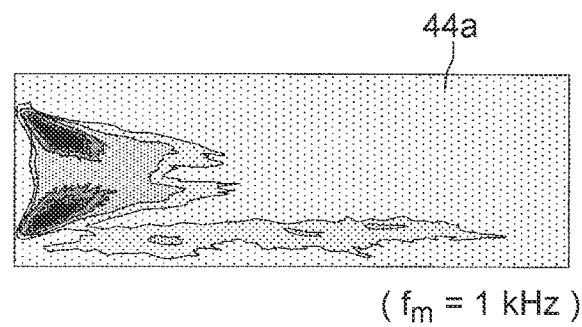
FIG. 14B is a distribution map of a surface pressure fluctuation on the upper surface of the step of the fore-step model calculated by an unsteady CFD software simulation.

FIG. 13A and FIG. 13B are distribution maps respectively of the estimated surface pressure fluctuation and the surface pressure fluctuation $p_\theta$ on the right front door glass 25 of the vehicle model 20. The frequency band of interest is set to 1 kHz. FIG. 14A and FIG. 14B are distribution maps respectively of the estimated surface pressure fluctuation and the surface pressure fluctuation $p_\theta$ on the upper surface 44a of the step 44 of the fore-step model 40. The frequency band of interest is set to 500 Hz. A darker shade represents a larger estimated surface pressure fluctuation or a larger surface pressure fluctuation $p_\theta$. A comparison between FIG. 13A and FIG. 13B shows that the magnitude and position of the estimated surface pressure fluctuation match the magnitude and position of the surface pressure fluctuation $p_\theta$ with good accuracy. Similarly, a comparison between FIG. 14A and FIG. 14B shows that the magnitude and position of the estimated surface pressure fluctuation match the magnitude and position of the surface pressure fluctuation $p_\theta$ with good accuracy. Thus, it has been proven that the surface pressure fluctuation calculated based on the PSD (estimated surface pressure fluctuation) has high accuracy of approximation relative to the surface pressure fluctuation calculated by the software performing the CFD calculation. This means that the PSD is highly reliable as an indicator.

Figure 15:
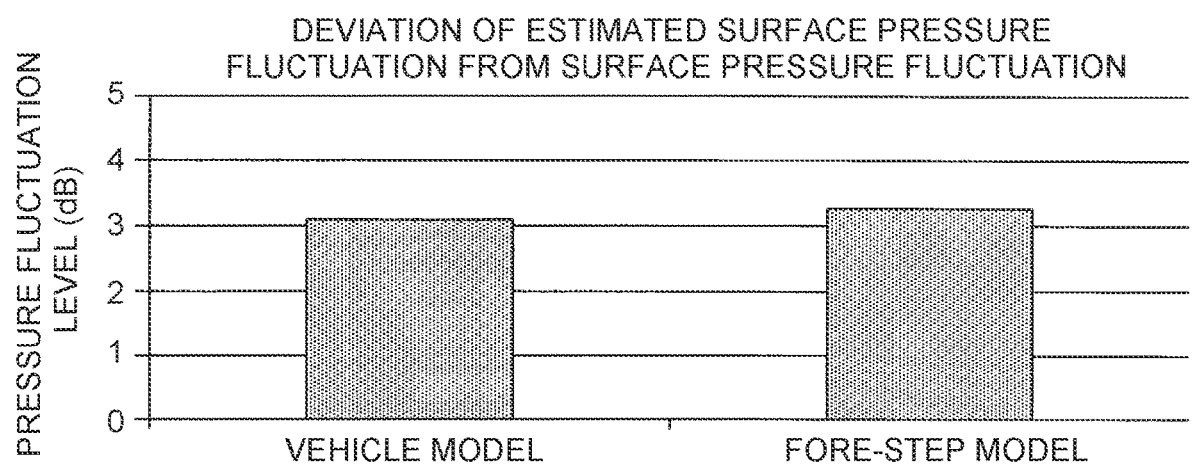
FIG. 15 is a graph showing a deviation of the estimated surface pressure fluctuation from the surface pressure fluctuation for each of the vehicle model and the fore-step model.

FIG. 15 is a graph showing "a deviation of the estimated surface pressure fluctuation from the surface pressure fluctuation $p_\theta$" for each of the vehicle model 20 and the fore-step model 40. The deviation for the vehicle model 20 is a value obtained by converting an average of "differences of the estimated surface pressure fluctuations from the surface pressure fluctuations $p_\theta$" at the corresponding nodes x in the two distribution maps shown in FIG. 13A and FIG. 13B into a pressure fluctuation level (dB). The deviation for the fore-step model 40 is a value obtained by converting an average of "differences of the estimated surface pressure fluctuations from the surface pressure fluctuations $p_\theta$" at the corresponding nodes x in the two distribution maps shown in FIG. 14A and FIG. 14B into a pressure fluctuation level (dB). A comparison between the deviation for the vehicle model 20 and the deviation for the fore-step model 40 shows that both are roughly equal at a level slightly higher than 3 dB. Thus, it has been proven that the deviation of the estimated surface pressure fluctuation from the surface pressure fluctuation $p_\theta$ is substantially constant regardless of the shape of the analysis target model. This means that the PSD is highly versatile as an indicator.

The workings and effects of the device of the embodiment will be described. The device of the embodiment calculates the PSD based on the physical quantities (average flow velocity U-, average vorticity Ω-, and turbulent flow velocity u~$_\theta$) calculated by an unsteady CFD simulation involving causing a vehicle model to run. The PSD is an indicator of the degree of contribution of a flow field to a surface pressure fluctuation $p_\theta$ (x). By using the PSD as an indicator, therefore, one can calculate the degree of contribution of the flow field to the surface pressure fluctuation $p_\theta$ (x) for each evaluation point z. Accordingly, it is possible to appropriately identify the position of the flow field inside the flow domain 21 that contributes significantly to the surface pressure fluctuation $p_\theta$ (x) of the vehicle model 20 at the observation point x.

Moreover, in the device of the embodiment, the value obtained by spatially integrating the PSD at the observation point x with respect to the flow domain 21 is an approximate value of the autocorrelation function of the surface pressure fluctuation $p_\theta$ (x) at the observation point x. Therefore, the behavior of the PSD matches the behavior of the surface pressure fluctuation $p_\theta$ (x) well. This means that the PSD is highly reliable as an indicator of the degree of contribution of the flow field to the surface pressure fluctuation $p_\theta$ (x) (see FIG. 12A to FIG. 15). Accordingly, the position of the flow field that contributes significantly to the surface pressure fluctuation $p_\theta$ (x) of the vehicle model can be appropriately identified.

Specifically, having hitherto no means of quantitatively evaluating the relation between a surface pressure fluctuation and a flow field, engineers have sometimes differed in their interpretation of a flow field. In addition, since an analysis is performed based on a distribution of a physical quantity in a cross-section of a flow field, the lack of information on a flow field in a three-dimensional space could lead to overlooking of a cause for a large surface pressure fluctuation. However, the device of the embodiment can quantitatively evaluate the relation between a surface pressure fluctuation $p_\theta$ (x) and a flow field by means of the PSD, which can significantly reduce the likelihood that engineers may differ in their interpretation of a flow field, and can improve the accuracy of a wind noise analysis. Moreover, the device of the embodiment identifies the position of a flow field that makes a high degree of contribution to the surface pressure distribution, and thereafter evaluates the distribution of a physical quantity in a cross-section at that position. Thus, the likelihood of a lack of information on the flow field can be significantly reduced, and consequently a cause for a large surface pressure fluctuation can be reliably found out.

The device of the embodiment displays a plane of equivalent PSD values on the display screen 18. Thus, by appropriately setting the reference value, the operator can view a plane of equivalent values having a desired PSD value. As a result, the evaluation point z corresponding to the desired PSD value can be efficiently selected, and the position of the flow field that contributes significantly to the surface pressure fluctuation $p_\theta$ (x) of the vehicle model 20 can be efficiently identified.

In the device of the embodiment, the observation point x is selected based on the magnitude of the surface pressure fluctuation calculated by the unsteady CFD calculation. The surface pressure fluctuation is strongly correlated with wind noise. Thus, this configuration allows for a more appropriate analysis of wind noise.

Modified Example 1

Next, a wind noise analyzer according to Modified Example 1 (hereinafter also referred to as a "first modified device") will be described. The first modified device is different from the device of the above embodiment in that the causal parameter is identified by the device and not by the operator. Specifically, the first modified device executes the following processes instead of the processes in steps 824 and 826 of FIG. 9. A computation unit of a calculation device of the first modified device identifies, as the causal parameter, a parameter that contributes relatively significantly to the PSD value among the three parameters (average flow velocity U-, average vorticity $\Omega$-, and turbulent flow velocity $u\sim_\theta$) composing the PSD at the evaluation point of interest z selected in step 822. Specifically, the computation unit identifies the causal parameter by comparing the numerical values of the three parameters at the evaluation point of interest z with the numerical values of the three parameters at "the evaluation point z corresponding to a PSD value lower than the PSD value at the evaluation point of interest z." According to this configuration, the need for the operator to identify the causal parameter is eliminated, so that the parameter responsible for the high PSD can be easily ascertained, and the shape of the vehicle model can be studied and changed more efficiently.

Modified Example 2

Next, a wind noise analyzer according to Modified Example 2 (hereinafter also referred to as a "second modified device") will be described. The second modified device is different from the device of the above embodiment in that the evaluation point of interest z is selected (extracted) by the device and not by the operator. Specifically, the second modified device executes the following processes instead of the processes in step 818 to step 822 of FIG. 8. Upon completion of the process in step 816, a computation unit of a calculation device of the second modified device creates data showing a plane of equivalent PSD values having an arbitrary value, and creates plane-of-equivalent-values data while changing the value of the PSD until the number of planes of equivalent values shown by the data becomes two. (To be exact, even after the number becomes two, the value of the PSD is increased until the surface area of each plane of equivalent values becomes as small as possible). Then, the computation unit extracts, as the evaluation point of interest z, an arbitrary point in one of the planes of equivalent values that is located at a longer distance to the observation point x. According to this configuration, the need for the operator to select the evaluation point of interest z is eliminated, so that the position of the flow field that contributes significantly to the surface pressure fluctuation of the vehicle model can be identified more efficiently. The second modified device extracts the evaluation point z corresponding to a maximum (substantially maximum) PSD value as the evaluation point of interest z. However, the present disclosure is not limited to this configuration, and an evaluation point of interest z that meets a preset condition may instead be extracted.

While the wind noise analyzers and the wind noise analysis methods of the embodiment and the modified examples have been described above, the present disclosure is not limited to the above embodiment and modified examples but can be modified in various ways.

For example, in the embodiment and the modified examples, a vehicle model is used as a structure model that is the analysis target. However, the present disclosure is not limited to this configuration, and for example, a structure model of an airplane, a ship, etc. may instead be used.

In the above embodiment and modified examples, an observation point at which the surface pressure fluctuation is relatively large is used as the analysis target. However, the present disclosure is not limited to this configuration, and for example, a node x having an average value of the surface pressure fluctuation in a predetermined range may instead be used as the observation point for an analysis.

In the above embodiment and modified examples, the node z in a plane of equivalent values can be selected as the evaluation point of interest z. However, the present disclosure is not limited to this configuration, and for example, a node z on an inner side of a plane of equivalent values may be selectable as the evaluation point of interest z.

In the above embodiment and modified examples, the observation point x is selected by the operator. However, the present disclosure is not limited to this configuration, and for example, the observation point x may instead be selected by the wind noise analyzer based on the value of the surface pressure fluctuation.

In the above embodiment and modified examples, the observation point x is selected based on the distribution map of the surface pressure fluctuation. However, the present disclosure is not limited to this configuration, and for example, the observation point x may be selected based on a physical quantity other than the surface pressure fluctuation, or an arbitrary node x may be selected by the operator as the observation point x.

What is claimed is:

1. A method comprising:
(A) executing, with a microcomputer, an unsteady computational fluid dynamics simulation involving moving of a vehicle model of a portion of a vehicle by calculating, for each of spatial nodes that are inside a predetermined region of a flow field of fluid around the vehicle model, an average flow velocity and an average vorticity during a predetermined time in the flow field inside the predetermined region, and then calculating, for each of the spatial nodes, a value based on an amplitude of a turbulent flow velocity inside the predetermined region, in an angular frequency band of interest that is a target angular frequency band of a wind noise analysis;
(B) calculating, with the microcomputer, for each of the spatial nodes, based on the average flow velocity, the average vorticity, and the value based on the amplitude of the turbulent flow velocity, a pressure source density that is an indicator of a degree of contribution of the flow field at the spatial node to a surface pressure fluctuation that is an amplitude of a pressure fluctuation at a target point of the wind noise analysis in a surface of the vehicle model;
(C) changing the vehicle model of the portion of vehicle so as to be a changed vehicle model, and repeating steps (A) and (B) for the changed vehicle model to confirm that the change in the vehicle model causes a decrease in the pressure source density of at least one of the spatial nodes; and
(D) manufacturing the portion of the vehicle according to the changed vehicle model in which there is the decrease in the pressure source density of the at least one of the spatial nodes.

* * * * *